US011019374B2

(12) United States Patent
Wallendael et al.

(10) Patent No.: US 11,019,374 B2
(45) Date of Patent: May 25, 2021

(54) TECHNIQUES FOR EFFICIENTLY PERFORMING SUBSEQUENCE-BASED ENCODING FOR A MEDIA TITLE

(71) Applicant: NETFLIX, INC., Los Gatos, CA (US)

(72) Inventors: Glenn Van Wallendael, Los Gatos, CA (US); Anne Aaron, Menlo Park, CA (US); Kyle Swanson, Los Gatos, CA (US); Jan De Cock, Cupertino, CA (US); Liwei Guo, Los Gatos, CA (US); Sonia Bhaskar, Menlo Park, CA (US)

(73) Assignee: NETFLIX, INC., Los Gatos, CA (US)

( * ) Notice: Subject to any disclaimer, the term of this patent is extended or adjusted under 35 U.S.C. 154(b) by 0 days.

(21) Appl. No.: 16/780,752

(22) Filed: Feb. 3, 2020

(65) Prior Publication Data

US 2020/0252666 A1   Aug. 6, 2020

Related U.S. Application Data

(60) Provisional application No. 62/800,934, filed on Feb. 4, 2019.

(51) Int. Cl.
*G06F 15/16* (2006.01)
*H04N 21/2343* (2011.01)
(Continued)

(52) U.S. Cl.
CPC ..... *H04N 21/23439* (2013.01); *H04L 65/602* (2013.01); *H04L 65/607* (2013.01);
(Continued)

(58) Field of Classification Search
None
See application file for complete search history.

(56) References Cited

U.S. PATENT DOCUMENTS

| 8,630,353 B1* | 1/2014 | Puri | H04N 19/23 |
| | | | 375/240.25 |
| 8,831,089 B1* | 9/2014 | Zhang | H04N 19/102 |
| | | | 375/240.01 |

(Continued)

OTHER PUBLICATIONS

International Search Report for application No. PCT/US2020/016528 dated May 28, 2020.
(Continued)

*Primary Examiner* — Phyllis A Book
(74) *Attorney, Agent, or Firm* — Artegis Law Group, LLP

(57) ABSTRACT

In various embodiments, an interpolation-based encoding application encodes a first subsequence included in a media title at each encoding point included in a first set of encoding points to generate encoded subsequences. Subsequently, the interpolation-based encoding application performs interpolation operation(s) based on the encoded subsequences to estimate a first media metric value associated with a first encoding point that is not included in the first set of encoding points. The interpolation-based encoding application then generates an encoding recipe based on the encoded subsequences and the first media metric value. The encoding recipe specifies a different encoding point for each subsequence included in the media title. After determining that the encoding recipe specifies the first encoding point for the first subsequence, the interpolation-based encoding application encodes the first subsequence at the first encoding point to generate at least a portion of an encoded version of the media title.

20 Claims, 8 Drawing Sheets

(51) Int. Cl.
*H04L 29/06* (2006.01)
*H04N 19/587* (2014.01)

(52) U.S. Cl.
CPC .......... *H04L 65/80* (2013.01); *H04N 19/587* (2014.11); *H04N 21/234354* (2013.01); *H04N 21/234381* (2013.01)

(56) References Cited

U.S. PATENT DOCUMENTS

| | | | |
|---|---|---|---|
| 10,616,590 B1* | 4/2020 | Wei | H04N 19/154 |
| 2007/0081588 A1* | 4/2007 | Raveendran | H04N 7/012 375/240.1 |
| 2014/0002670 A1* | 1/2014 | Kolarov | H04N 17/004 348/180 |
| 2016/0212373 A1* | 7/2016 | Aharon | H04N 19/513 |
| 2016/0212433 A1* | 7/2016 | Zhu | H04N 19/186 |
| 2018/0302456 A1 | 10/2018 | Katsavounidis et al. | |
| 2018/0343458 A1 | 11/2018 | Katsavounidis et al. | |
| 2019/0075299 A1* | 3/2019 | Sethuraman | H04N 19/115 |

OTHER PUBLICATIONS

Takeuchi et al., "Perceptual Quality Driven Adaptive Video Coding Using JND Estimation", 2018 Picture Coding Symposium (PCS), IEEE, XP033398620, DOI: 10.1109/PCS.2018.8456297, Sections I-IV and VI, Jun. 24, 2018, pp. 179-183.

Cock et al., "Complexity-Based Consistent-Quality Encoding in the Cloud", 2016 IEEE International Conference on Image Processing (ICIP), IEEE, DOI: 10.1109/ICIP.2016.7532605 Retrieved on Aug. 3, 2016, Sections 1-4, Sep. 25, 2016, pp. 1484-1488.

* cited by examiner

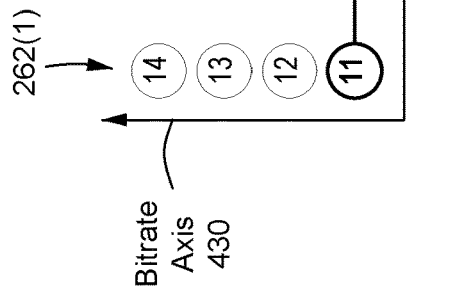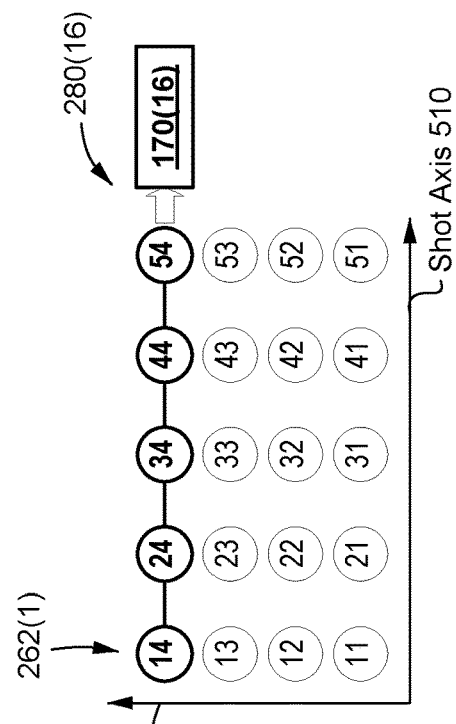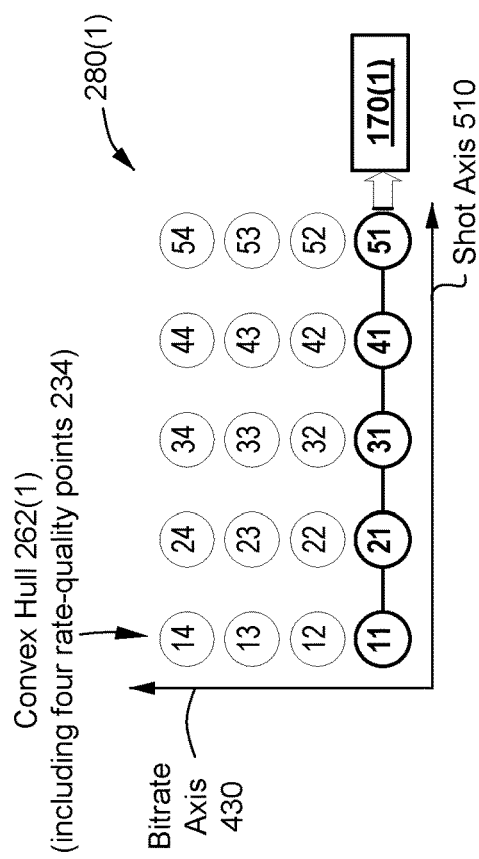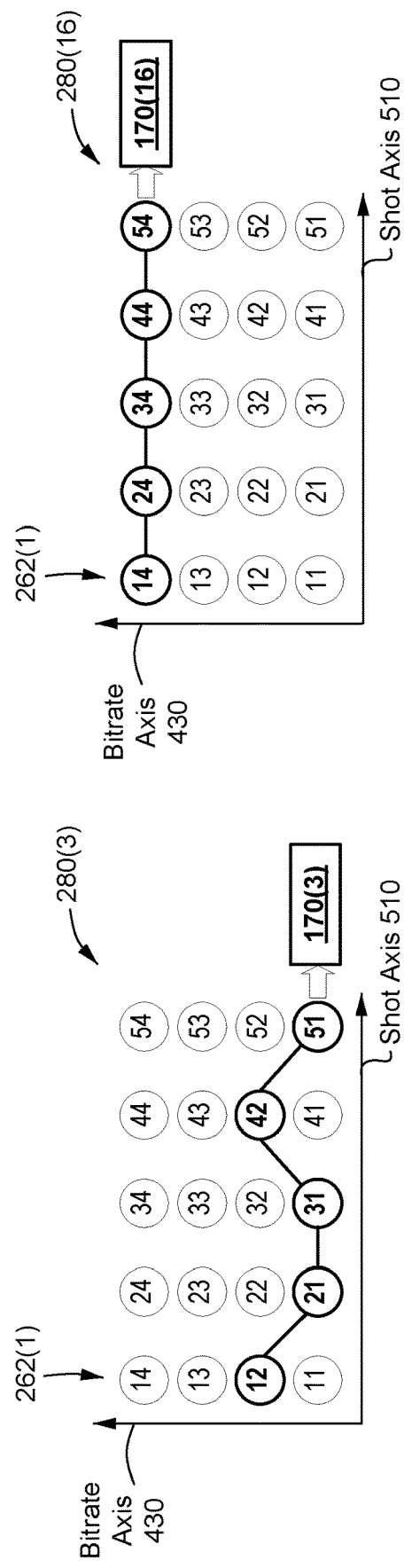
FIGURE 5A
FIGURE 5B
FIGURE 5C
FIGURE 5D

TECHNIQUES FOR EFFICIENTLY PERFORMING SUBSEQUENCE-BASED ENCODING FOR A MEDIA TITLE

CROSS-REFERENCE TO RELATED APPLICATIONS

This application claims the priority benefit of the United States Provisional Patent Application titled, "INTERPOLATIONDOE DYNAMIC OPTIMATION," filed Feb. 4, 2019 and having Ser. No. 62/800,934. The subject matter of this related application is hereby incorporated herein by reference

BACKGROUND

Field of the Various Embodiments

The various embodiments relate generally to computer science and media processing and, more specifically, to techniques for efficiently performing subsequence-based encoding for a media title.

Description of the Related Art

A typical media streaming service provides access to a library of media titles that can be viewed on a range of different endpoint devices. Each endpoint device may connect to the media streaming service under different connection conditions that affect bandwidth and latency. In many implementations, an endpoint device that connects to a media streaming service executes an endpoint application that determines, for a given media title, an appropriate encoded version of the media title to stream to the endpoint device based on the connection conditions and the properties of the endpoint device. More specifically, the endpoint application attempts to select a particular encoded version of the media title that provides the best possible visual quality during playback of the media title on the endpoint device while avoiding playback interruptions due to re-buffering.

In some implementations, the endpoint application selects the particular encoded version of the media title based on a bitrate ladder. The bitrate ladder is designed to achieve a target visual quality during playback of a media title based on an available bandwidth. Each rung in the bitrate ladder specifies a different bitrate-resolution pair corresponding to a different pre-generated encoded version of the media title. To generate the encoded version of a media title corresponding to a given bitrate-resolution pair, the media content associated with the media title is sampled at the resolution to generate sampled media content. One or more encoding parameter values are selected based on the bitrate and then used to encode the sampled media content.

One drawback of the above "monolithic" encoding technique is that the complexity of the media content associated with a given media title oftentimes varies across the media title; whereas, the resolution and the encoding parameter value(s) used to encode the media content do not vary. As a result, encoding relatively simple portions of the media title may consume more computational and storage resources than what is necessary to meet the target visual quality. For example, a relatively simple portion of a media title could have the same visual quality regardless of whether that portion of media content is encoded using a bitrate of 560 kilobits per second ("kbps") or using a bitrate of 3000 kbps. Among other things, such encoding inefficiencies waste computational and storage resources and increase the bandwidth required to stream encoded versions of media titles to endpoint devices.

In other implementations, to reduce the inefficiencies experienced with monolithic encoding techniques, a media streaming service provider varies the combinations of resolution and encoding parameter value(s) or "encoding points" across the media title. Typically, a subsequence-based encoding application partitions the media title into different subsequences, where each subsequence corresponds to a different shot that includes media content captured continuously from a given camera or other capture point. The subsequence-based encoding application then encodes each subsequence numerous times at a variety of different encoding points to generate encoded subsequences. Subsequently, the subsequence-based encoding application performs optimization operations to generate different optimized encoded versions of the media title. Each optimized encoded version of the media title includes a different combination of the encoded subsequences that span the length of the media title, and the encoding point may vary between the constituent encoded subsequences.

With subsequence-based encoding techniques, the reduction in the encoding inefficiencies typically seen with monolithic encoding techniques correlates to the number of encoding points used to generate the encoded subsequences. However, as the number of encoding points increases, the time and computational resources required to generate the different encoded subsequences also increase. Further, media streaming service providers oftentimes use at least one relatively complex encoder, which increases the time and computational resources required to encode any given media title. To offset the increased time and computational resources required for encoding, a media streaming service provider may limit the total number of encoding points, which, in turn, can inadvertently limit the encoding inefficiency reductions that subsequence-based encoding techniques are designed to achieve in the first place.

For example, suppose that the subsequence-based encoding application nominally generates encoded subsequences for the 312 different encoded points associated with 6 available resolutions and 52 available values for an encoding parameter. If a given media title includes 100 subsequences, then the subsequence-based encoding application would generate 31200 different encoded subsequences. The computational resources required to generate the 31200 different encoded subsequences using a relatively complex encoder could be 150 central processing unit ("CPU") days. For a media streaming service provider that encodes thousands of media titles, the total computational resources required to generate the different optimized encoded versions of the media titles based on 384 encoding points could become quite prohibitive. In such situations, the media streaming service provider could configure the subsequence-based encoding application to disregard some of the nominal encoding points. But, because the resulting optimized encoded versions of the media title would not include any subsequences encoded at the disregarded encoding points, the overall reduction in encoding inefficiencies could be limited.

As the foregoing illustrates, what is needed in the art are more effective techniques for encoding media titles.

SUMMARY

One embodiment of the present invention sets forth a computer-implemented method for encoding a media title.

The method includes encoding a first subsequence included in the media title across a first plurality of encoding points to generate a first plurality of encoded subsequences; performing one or more interpolation operations based on the first plurality of encoded subsequences to estimate a first media metric value associated with a first encoding point that is not included in the first plurality of encoding points; generating a first encoding recipe that specifies a different encoding point for each subsequence included in the media title based on the first plurality of encoded subsequences and the first media metric value; determining that the first encoding recipe specifies the first encoding point for the first subsequence; and encoding the first subsequence at the first encoding point to generate at least a portion of a first encoded version of the media title.

At least one technical advantage of the disclosed techniques relative to the prior art is that the number of different encoding points at which each subsequence included in a media title can be encoded is increased without increasing the total number of encoded subsequences. Allowing the encoding points to vary across an encoded version of the media title reduces the encoding inefficiencies typically associated with monolithic encoding techniques, and maintaining or reducing the total number of generated encoded subsequences maintains or reduces the overall time and computation resources required to encode the media title at one or more target bitrate(s) relative to prior art subsequence-based techniques. These technical advantages provide one or more technological advancements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

FIGS. 5A-5D are more detailed illustrations of how the trellis iterator of FIG. 2 generates encoding recipes based on rate-quality points, according to various embodiments;

DETAILED DESCRIPTION

Figure 1:
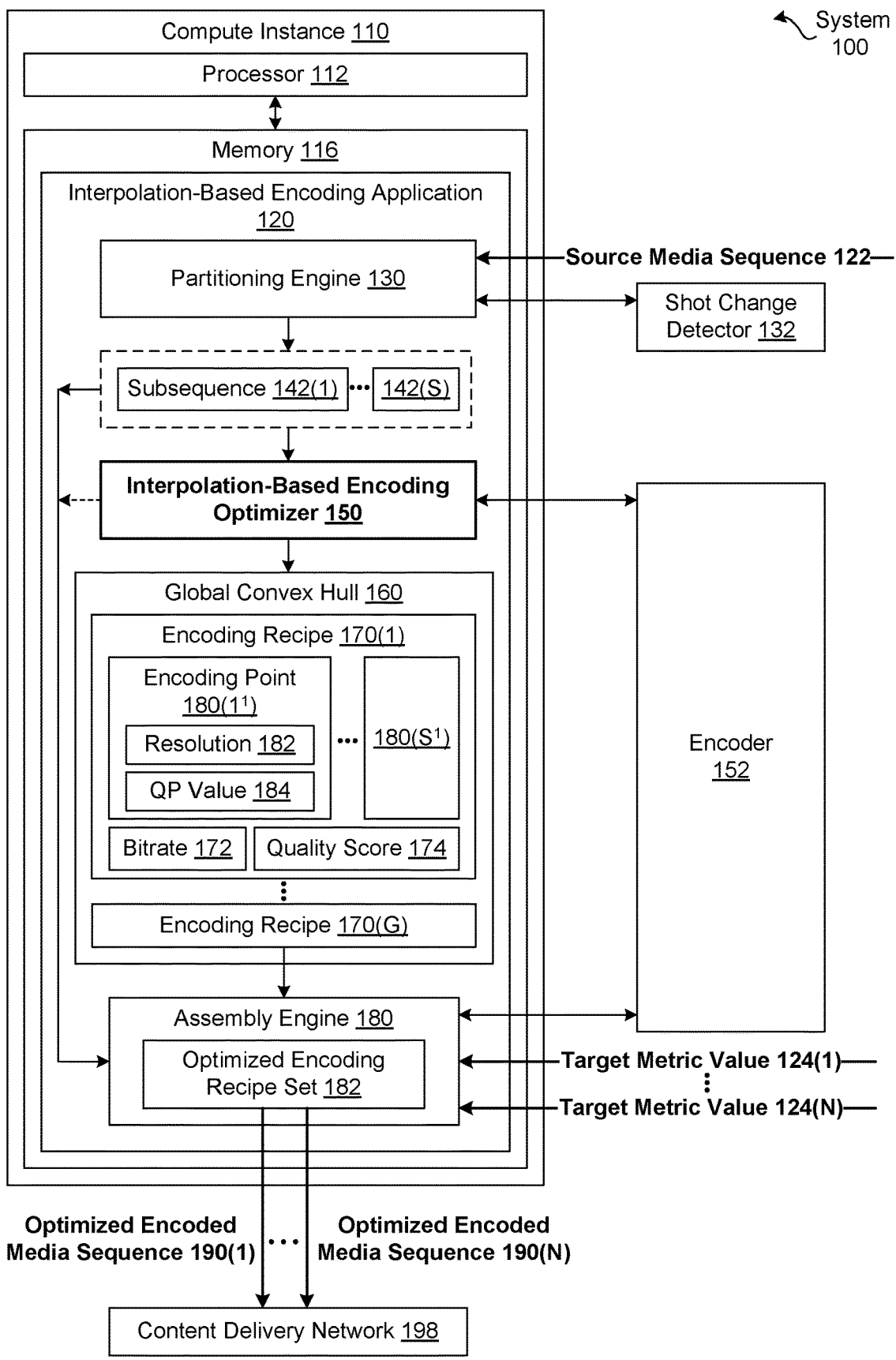
FIG. 1 is a conceptual illustration of a system configured to implement one or more aspects of the various embodiments.

In the following description, numerous specific details are set forth to provide a more thorough understanding of the various embodiments. However, it will be apparent to one skilled in the art that the inventive concepts may be practiced without one or more of these specific details.

To optimize the overall visual experience that a media streaming service provides to viewers, the media streaming service provider oftentimes generates a bitrate ladder for each media title. The bitrate ladder for a given media title allows client-side endpoint devices to achieve a target visual quality during playback of the media title based on an available bandwidth. Each rung in the bitrate ladder specifies a different bitrate-resolution pair corresponding to a different pre-generated encoded version of the media title.

Some media streaming service providers use monolithic encoding techniques to generate the different encoded versions of the media title. Namely, the resolution and encoding parameter value(s) used to encode the media content associated with a given media title do not vary across the media title. However, because the complexity of the media content associated with a given media title typically varies across the media title, the resulting encoded versions of the media title are often associated with encoding inefficiencies. More specifically, encoding relatively simple portions of the media title may consume more computational and storage resources than are necessary to meet the target visual quality. Further, the bandwidth required to stream the encoded versions of the media title may be unnecessarily large.

For example, a movie could include relatively complex action portions and relatively simple monologues. The monologues could have the same visual quality regardless of whether the monologues are encoded using a bitrate of 3000 kbps or are encoded using a bitrate of 560 kbps. By contrast, the required resources (e.g., computational resources, storage resources, bandwidth, etc.) associated with encoding the monologues using a bitrate of 3000 kbps exceed the required resources associated with encoding the monologues using a bitrate of 560 kbps. Accordingly, encoding the entire movie using a bitrate of 3000 kbps needlessly wastes computational and storage resources and unnecessarily increases the bandwidth required to stream the encoded version of the movie to endpoint devices.

To reduce the encoding inefficiencies typically associated with monolithic encoding techniques, some media streaming service providers use a conventional subsequence-based encoding application to generate different optimized encoded versions of a given media title. The conventional subsequence-based application varies the combinations of resolution and encoding parameter value(s) across the media title based on a target metric value, such as a target visual quality score or a target bitrate. Each optimized encoded version of the media title is associated with a different target metric value.

Typically, the conventional subsequence-based encoding application partitions the media title into different subsequences, where each subsequence corresponds to a shot sequence that includes media content captured continuously from a given camera or other capture point. The conventional subsequence-based encoding application then encodes each subsequence numerous times at a variety of different encoding points to generate encoded subsequences. Each encoding point is a different combination of a resolution and encoding parameter value(s). Subsequently, the conventional subsequence-based encoding application performs optimization operations to generate different optimized encoded versions of the media title. As a result, the conventional subsequence-based encoding application reduces the encoding inefficiencies typically associated with monolithic encoding techniques described above.

As the number of encoding points increases, the reduction in the encoding inefficiencies also increases. However, as the number of encoding points increases, the time and amount of computation resources required to generate the different encoded versions of a given media title also increase. To reduce the time and amount of computational resources required to encode a library of media titles, a media streaming service provider could configure the conventional subsequence-based encoding application to consider only a subset of the pertinent encoding points. However, because the resulting encoded versions of the media titles would not include any encoded subsequences generated using the disregarded encoding points, the overall reduction in encoding inefficiencies would be limited.

For example, suppose that the conventional subsequence-based encoding application nominally generates encoded subsequences for the 312 encoding points associated with 6 available resolutions and 52 available values (from 0 to 51) for an encoding parameter. For a media title that includes 100 subsequences, the conventional subsequence-based encoding application would generate 31200 different encoded subsequences. The computational resources required to generate the 31200 different encoded subsequences using a relatively complex encoder could be 150 CPU days.

To reduce the time and amount of computational resources required to generate the different encoded versions of the media title, the media streaming service provider could re-configure the conventional subsequence-based encoding application to consider only the 3 values of 0, 26, and 51 for the encoding parameter. Because the conventional subsequence-based encoding application would generate 1800 different encoded subsequences instead of 38400 different encoded subsequences, the time and amount of computational resources required to generate the different encoded versions of the media title would be substantially decreased. However, each of the encoded subsequences included in the resulting encoded versions of the media title would be generated using an encoding parameter value of 0, 26, or 51. Since the variation in the value of the encoding parameter across the media title would be limited, the overall reduction in encoding inefficiencies would also be limited.

With the disclosed techniques, however, an interpolation-based encoding application can reduce the time and computational resources used to encode subsequences when performing subsequence-based encoding of a given media title without reducing the number of useful encoding points. Because the resulting encoded versions of the media title can include encoded subsequences associated with any of the encoding points, the interpolation-based encoding application does not limit the reduction in encoding inefficiencies associated with monolithic techniques.

In some embodiments, the interpolation-based encoding application encodes each of the subsequences using a limited set of initial encoding points to generate encoded subsequences. The interpolation-based encoding application then computes optimization data, such as bitrate and quality score, for each of the encoded subsequences. Subsequently, the interpolation-based encoding application performs interpolation operations based on the optimization data to generate different estimated optimization data for each of any number of interpolated encoding points. The interpolation-based encoding application then performs optimization operations based on the optimization data and the estimated optimization data to determine optimized encoding recipes based on target metric values, such as target bitrates. Each optimized encoding recipe specifies a different encoding point—either an initial encoding point or an interpolated encoding point—for each subsequence. For each interpolated encoding point specified in the optimized encoding recipes, the interpolation-based encoding application generates the corresponding encoded subsequence. The interpolation-based encoding application then generates optimized encoded versions of the media title based on the encoded subsequences and the optimized encoding recipes.

At least one technical advantage of the disclosed techniques relative to the prior art is that interpolation-based encoding application can increase the number of different encoding points at which each subsequence included in a given media title can be encoded without increasing the number of encoded subsequences generated to determine the optimized encoding recipes. Increasing the number of different encoding points at which each subsequence can be encoded reduces the encoding inefficiencies typically associated with monolithic encoding techniques. And because generating numerous encoded subsequences is usually time consuming and computationally expensive, reducing the number of generated encoded subsequences reduces the overall time and computation resources required to encode the media title at different target metric values relative to prior art subsequence-based encoding techniques. These technical advantages provide one or more technological advancements over the prior art.

For example, suppose that a conventional subsequence-based encoding application is configured to generate encoded subsequences for the 312 encoding points associated with 6 available resolutions and 52 available values (from 0 to 51) for an encoding parameter. For a media title that includes 100 subsequences, the conventional sequence-based encoding application would generate 31200 different encoded subsequences. The computational resources required to generate the 31200 different encoded subsequences using a relatively complex encoder could be 150 CPU days. By contrast, suppose that the interpolation-based encoding application is configured to initially generate encoded subsequences for the 18 encoding points associated with 3 of the encoding parameter values and perform interpolation operations to estimate the optimization data for the remaining 294 encoding points. The total number of encoded subsequences that the interpolation-based encoding application generates is at most 1900—a decrease of more than 94% relative to the conventional subsequence-based encoding application. Furthermore, the computational resources required for the interpolation-based encoding application to generate the different encoded subsequences using a relatively complex encoder could decrease by more than 141 CPU days relative to the subsequence-based encoding application.

System Overview

FIG. 1 is a conceptual illustration of a system 100 configured to implement one or more aspects of the various embodiments. As shown, the system 100 includes, without limitation, a compute instance 110, a shot change detector 132, an encoder 152, and a content delivery network ("CDN") 198. For explanatory purposes, multiple instances of like objects are denoted with reference numbers identifying the object and parenthetical alphanumeric character(s) identifying the instance where needed.

Any number of the components of the system 100 may be distributed across multiple geographic locations or implemented in one or more cloud computing environments (i.e., encapsulated shared resources, software, data, etc.) in any combination. In alternate embodiments, the system 100 may include any number of compute instances 110. Each compute instance 110 may be implemented in a cloud computing environment, implemented as part of any other distributed computing environment, or implemented in a stand-alone fashion.

As shown, the compute instance 110 includes, without limitation, a processor 112 and a memory 116. The processor 112 may be any instruction execution system, apparatus, or device capable of executing instructions. For example, the processor 112 could comprise a central processing unit, a graphics processing unit, a controller, a micro-controller, a state machine, or any combination thereof. The memory 116 stores content, such as software applications and data, for use by the processor 112 of the compute instance 110. In alternate embodiments, each of any number of compute instances 110 may include any number of processors 112 and any number of memories 116 in any combination. In particular, any number of the compute instances 110 (including one) may provide a multiprocessing environment in any technically feasible fashion.

The memory 116 may be one or more of a readily available memory, such as random access memory, read only memory, floppy disk, hard disk, or any other form of digital storage, local or remote. In some embodiments, a storage (not shown) may supplement or replace the memory 116. The storage may include any number and type of external memories that are accessible to the processor 112. For example, and without limitation, the storage may include a Secure Digital Card, an external Flash memory, a portable compact disc read-only memory, an optical storage device, a magnetic storage device, or any suitable combination of the foregoing.

In general, each compute instance 110 is configured to implement one or more applications or subsystems of applications. For explanatory purposes only, each application is described as residing in the memory 116 of a single compute instance 110 and executing on a processor 112 of the single compute instance 110. However, in alternate embodiments, the functionality of each application may be distributed across any number of other applications that reside in the memories 116 of any number of compute instances 110 and execute on the processors 112 of any number of compute instances 110 in any combination. Further, the functionality of any number of applications or subsystems may be consolidated into a single application or subsystem.

In particular, the compute instance 110 is configured to generate encoded versions of a media title for streaming to endpoint devices (not shown). As described in detail previously herein, some media streaming service providers use monolithic encoding techniques to generate each encoded version of a media title based on a single associated encoding point. To reduce encoding inefficiencies typically associated with monolithic encoding techniques, some media streaming service providers use subsequence-based encoding techniques that vary the encoding points across each encoded version of the media title. In a typical conventional approach to subsequence-based encoding, a subsequence-based encoding application partitions the media title into subsequences. The subsequence-based encoding application then encodes each subsequence multiple times based on a variety of different encoding points to generate numerous encoded subsequences. To generate an encoded version of the media title, the subsequence-based encoding application selects a combination of the encoded subsequences that span the length of the media title One drawback of the above approach to subsequence-based encoding is that the reduction in the encoding inefficiencies typically seen with monolithic encoding techniques correlates to the number of encoding points used to generate the encoded subsequences. However, as the number of encoding points increases, the time and computational resources required to generate the different encoded subsequences also increase. To offset the increased time and computational resources required for encoding, a media streaming service provider may limit the total number of encoding points, which, in turn, can inadvertently limit the encoding inefficiency reductions that subsequence-based encoding techniques are designed to achieve in the first place.

Increasing the Efficiency of Subsequence-Based Encoding

To reduce the overall time and computational resources used to perform subsequence-based encoding without limiting the number of available encoding points, the system 100 includes, without limitation, an interpolation-based encoding application 120. The interpolation-based encoding application 120 resides in the memory 116 and executes on one of the processor 112 of the compute instance 110. In alternate embodiments, the functionality of the interpolation-based encoding application 120 may be distributed across any number of applications and/or subsystems that execute on any number of compute instances 112 in any combination. As shown, the interpolation-based encoding application 120 includes, without limitation, a partitioning engine 130, an interpolation-based encoding optimizer 150, and an assembly engine 180.

The partitioning engine 130 partitions a source media sequence 122 into subsequences 142(1)-142(S), where S may be any positive integer. The source media sequence 122 includes, without limitation, any amount and type of media content that is associated with a media title. For instance, the source media sequence 122 may include, without limitation, any portion (including all) of a feature length film, an episode of a television program, or a music video, to name a few. Each of the subsequences 142 includes, without limitation, a set of frames that usually have similar spatial-temporal properties and run for an uninterrupted period of time.

The partitioning engine 130 may partition the source media sequence 122 into any number and type of subsequences 142 in any technically feasible fashion. For instance, in some embodiments, the partitioning engine 130 partitions the source media sequence 122 into shot sequences based on shot changes (not shown). As used herein, each shot sequence refers to a single subsequence 142 that is captured continuously from a single camera or virtual representation of a camera (e.g., in the case of computer animated video sequences). Each shot change specifies a boundary between a different pair of shot sequences.

The partitioning engine 130 may determine the shot changes in any technically feasible fashion. For instance, in some embodiments, the partitioning engine 130 transmits the source media sequence 122 to the shot change detector 132. The shot change detector 132 resides in the memory 116 and executes on any number of processors 112 associated with any number of compute instances 110. To determine the shot changes, the shot change detector 132 applies any number of shot detection algorithms to the source media sequence 122. Some examples of shot detection algorithms include, without limitation, a multi-scale sum-of-absolute-differences algorithm, a motion-compensated residual energy algorithm, a histogram of differences algorithm, a difference of histograms algorithm, and so forth. The shot change detector 132 then transmits the shot changes to the partitioning engine 130. In other embodiments, the partitioning engine 130 may perform any number of shot detection operations on the source media sequence 122 to determine the shot changes.

In some embodiments, the partitioning engine 130 may also remove extraneous pixels from the source media sequence 122. For example, the partitioning engine 130 could remove pixels included in black bars along border sections of the source media sequence 122. In the same or other embodiments, the interpolation-based encoding application 120 ensures that the initial frame of each subsequence 142 is encoded as a key frame during encoding operations. As a general matter, a "key frame" and all subsequent frames from the same subsequence 142 that are included in an encoded media sequence are decoded independently of any proceeding frames included the encoded media sequence.

The interpolation-based encoding application 120 may ensure that the different initial frames of the different subsequences 142 are encoded as key frames in any technically feasible fashion. For instance, in some embodiments, the interpolation-based encoding application 120 configures an encoder 152 to encode frames as key frames based on a key frame location list (not shown) when encoding media content. In other embodiments, the interpolation-based encoding application 120 may perform any number of encoding operations to encode the different initial frames of the different subsequences 142 as key frames when encoding media content.

As persons skilled in the art will recognize, during playback, the media title associated with the source media sequence 122 is switchable between decoded versions of different optimized encoded media sequences 190 at aligned key frames to optimize a viewing experience based on any number of relevant criteria. Examples of relevant criteria include the current connection bandwidth, the current connection latency, the content of the upcoming subsequence 142, and the like.

As shown, the interpolation-based encoding optimizer 150 generates a global convex hull 160 of encoding recipes 170 based on the subsequences 142. Upon receiving the subsequences 142, the interpolation-based encoding optimizer 150 encodes each of the subsequences 142 at each encoding point 180 included in a pre-encode list (not shown in FIG. 1) to generate encoded subsequences (not shown in FIG. 1). Each encoding point 180 includes, without limitation, a resolution 182 and a quantization parameter ("QP") value 184.

The QP value 184 is a value for an encoding parameter that allows a monotonic performance in terms of bitrate and level of quality when encoding media content. The higher the QP value 184, the lower the resulting bitrate at the expense of a lower level of quality. In alternate embodiments, each of the encoding points 180 may include any number and type of encoding parameters instead of or in addition to the QP value 184 and the techniques described herein are modified accordingly.

Each encoded subsequence includes, without limitation, encoded media content that is derived from the media content included in the associated subsequence 142 based on the associated encoding point 180. The interpolation-based encoding optimizer 150 may generate the encoded subsequences in any technically feasible fashion. Further, as a general matter, the interpolation-based encoding optimizer 150 may generate encoded media content derived from media content based on a given encoding point 180 in any technically feasible fashion.

For instance, in some embodiments, the interpolation-based encoding optimizer 150 performs sampling operations on the media content based on the resolution 182 included in the encoding point 180 to generate sampled media content. Subsequently, the interpolation-based encoding optimizer 150 configures the encoder 152 to encode the sampled media content using the QP value 184 included in the encoding point 180 to generate encoded media content.

The encoder 152 resides in the memory 118 and executes on any number of the processors 112 included in any number of compute instances 110. For instance, in some embodiments, the encoder 152 is configured to efficiently perform encoding operations via one or more parallel encoders (not shown). In some embodiments, the encoder 152 and the parallel encoders reside and execute on compute instances 110 included in the cloud. In alternate embodiments, the interpolation-based encoding optimizer 150 may perform encoding operations and the system 100 may omit the encoder 152. In the same or other embodiments, the system 100 may include a sampling application, and the interpolation-based encoding optimizer 150 may configure the sampling application to perform sampling operations.

The interpolation-based encoding optimizer 150 may perform sampling operations and encoding operations at any level of granularity (e.g., per frame, per subsequence, per media sequence, etc.) in any combination and in any technically feasible fashion. For instance, in some embodiments, the interpolation-based encoding optimizer 150 may perform sampling operations on the source media sequence 122 based on a given resolution 182 to generate a sampled media sequence. Subsequently, for each encoding point 180 that includes the resolution 182, the interpolation-based encoding optimizer 150 may configure the encoder 152 to encode the sampled media content corresponding to associated subsequence 142 using the QP value 184.

Importantly, the pre-encode list includes only a subset of the encoding points 180 that the interpolation-based encoding optimizer 150 is configured to evaluate when generating the optimized encoded media sequences 190. In some embodiments, for each resolution 182 that the interpolation-based encoding optimizer 150 is configured to evaluate, the pre-encode list includes, without limitation, at least three encoding points 180 that span the range of QP values 184 that the interpolation-based encoding optimizer 150 is configured to evaluate. In alternate embodiments, the minimum number of encoding points 180 that can be included in the pre-encode list for each resolution 182 may vary depending on the interpolation techniques(s) implemented by the interpolation-based encoding optimizer 150. For explanatory purposes only, the encoding points 180 included in the pre-encode list are also referred to herein as "initial" encoding points 180, and the other encoding points 180 that the interpolation-based encoding optimized 150 is configured to evaluate are also referred to herein as "interpolated" encoding points 180.

For each of the encoded subsequences, the interpolation-based encoding optimizer 150 computes a bitrate 172 and a quality score 174. The quality score 172 is a value for any type of visual quality metric. For instance, the quality score 174 may be a peak signal-to-noise-ratio ("PSNR"), a value for a linear video multimethod assessment fusion ("VMAF") metric, or a value for a harmonic VMAF ("VMAFh") metric, to name a few. In alternate embodiments, the interpolation-based encoding optimizer 150 may compute any amount and type of optimization data instead of or in addition to the bitrate 172 and the quality score 174. For instance, in some embodiments, the interpolation-based encoding optimizer 150 computes a total number of bits instead of the bitrate 172. In the same or other alternate embodiments, the interpolation-based encoding optimizer computes a distortion level instead of the quality score 174.

The interpolation-based encoding optimizer 150 performs any number and type of interpolation operations based on the bitrates 172, the quality scores 174, and the initial encoding points 180 to estimate the bitrate 172 and the quality score 174 for each of the interpolated encoding points 180. The sequence-based encoding application then performs optimization operations based on the bitrates 172 and the quality scores 174 for the initial encoding points 180 and the interpolated encoding points 180 to generate the global convex hull 160. As shown, the global convex hull 160 includes, without limitation, any number of encoding recipes 170. Notably, for the source media sequence 122, each of the encoding recipes 170 included in the global convex hull 160 describes how to generate a different encoded media sequence (not shown in FIG. 1) that minimizes the bitrate 172 for a different quality score 174. Each encoded media sequences includes, without limitation, S encoded subsequences that are encoded versions of the subsequences 142(1)-142(S), respectively.

As shown, each of the encoding recipes 170(x) includes, without limitation, the bitrate 172 associated with the encoding recipe 170(x), the quality score 174 associated with the encoding recipe 170(x), and the encoding points 180($1^x$)-180($S^x$). The bitrate 172 and the quality score 174 associated with the encoding recipe 170(x) estimate the bitrate 172 and the quality score 172, respectively, for an encoded media sequence generated as per the encoding points 180($1^x$)-180($S^x$).

For explanatory purposes only, each of the encoding points 180 included in the encoding recipe 170(x) specifies the associated subsequence 142 via the normal portion of the parenthetical alphanumeric character and specifies the encoding recipe 170 via the subscript portion of the parenthetical alphanumeric character. Accordingly, the encoding points 180($1^x$)-180($S^x$) are included in the encoding recipe 170(x) and specify how to encode the subsequences 142(1)-142(S), respectively, to generate the S encoded subsequences included in an encoded media sequence.

As shown, the assembly engine 180 generates the optimized encoded media sequences 190(1)-190(N) based on the encoding recipes 170 included in the global convex hull 280 and target metric values 124(1)-124(N). Each of the target metric values 124 is a different value for a media metric. The media metric may be any measurement that corresponds to one or more properties of encoded video content, video content, audio content, and/or encoded audio content. In some embodiments, the media metric is a bitrate. In some alternate embodiments, the media metric is a visual quality metric. In other alternate embodiments, the media metric is a distortion metric. The optimized encoded media sequences 190(1)-190(N) are associated with the target metric values 124(1)-124(N), respectively.

For each of the target metric values 124, the assembly engine 180 selects the encoding recipe 170 included in the global convex hull 160 that has a metric value closest to the target metric value 124. The assembly engine 180 then adds the selected encoding recipe 170 to an optimized encoding recipe set 182. Subsequently, the assembly engine 180 generates the optimized encoded media sequences 190 as per the encoding recipes 170 included in the optimized encoding recipe set 182, the encoded subsequences generated by the interpolation-based encoding optimizer 150, and the subsequences 142.

The assembly engine 180 then transmits the optimized encoded media sequences 190 to the CDN 198 for distribution to any number of endpoint devices. In alternate embodiments, the assembly engine 180 may transmit the optimized encoded media sequences 190 to any number of software applications instead of or in addition to the CDN 198. In the same or other alternate embodiments, the assembly engine 180 may transmit the optimized encoding recipe set 182 and, optionally, the encoded subsequences specified in the optimized encoding recipe set 182 to any number of software applications. The assembly engine 180 is described in greater detail in conjunction with FIG. 6.

For explanatory purposes only, the techniques described herein are described in the context of video encoding. However, as persons skilled in the art will recognize, the techniques described herein may be modified to optimize audio encoding instead of or in addition to video encoding. For example, in some embodiments, an audio track may be partitioned into audio scenes. The audio scenes may be sampled via audio rendering hardware. The sampled audio scenes may be encoded via an audio encoder that is configured via a quantization parameter and/or bitrate settings. The quality scores of the encoded audio scenes may be computed via a perceptual audio quality metric, such as the Perceptual Evaluation of Audio Quality ("PEAQ") algorithm. Notably, the resolution 182 and/or any number of encoding parameters may be optimized for each audio scene based on any of the techniques described herein in any combination.

Note that the techniques described herein are illustrative rather than restrictive, and may be altered without departing from the broader spirit and scope of the invention. Many modifications and variations on the functionality provided by the interpolation-based encoding application 120, the partitioning engine 130, the interpolation-based encoding optimizer 150, the assembly engine 180, the shot change detector 132, the encoder 152, and the content delivery network 198 will be apparent to those of ordinary skill in the art without departing from the scope and spirit of the described embodiments. For instance, in various embodiments, one or more of the interpolation-based encoding application 120, the partitioning engine 130, and the interpolation-based encoding optimizer 150 may be configured to identify and operate on sets of frames for which a consistency metric lies within a specified range instead of the subsequences 142. Each set of frames is also referred to herein as a subsequence. In a complementary fashion, an encoded set of frames is also referred to herein as an encoded subsequence.

It will be appreciated that the system 100 shown herein is illustrative and that variations and modifications are possible. For example the functionality provided by the interpolation-based encoding application 120, the partitioning engine 130, the interpolation-based encoding optimizer 150, the assembly engine 180, the shot change detector 132, the encoder 152, and the content delivery network 198 as described herein may be integrated into or distributed across any number of software applications (including one), hardware devices (e.g., a hardware-based encoder), and any number of components of the system 100. Further, the connection topology between the various units in FIG. 1 may be modified as desired.

Figure 2:
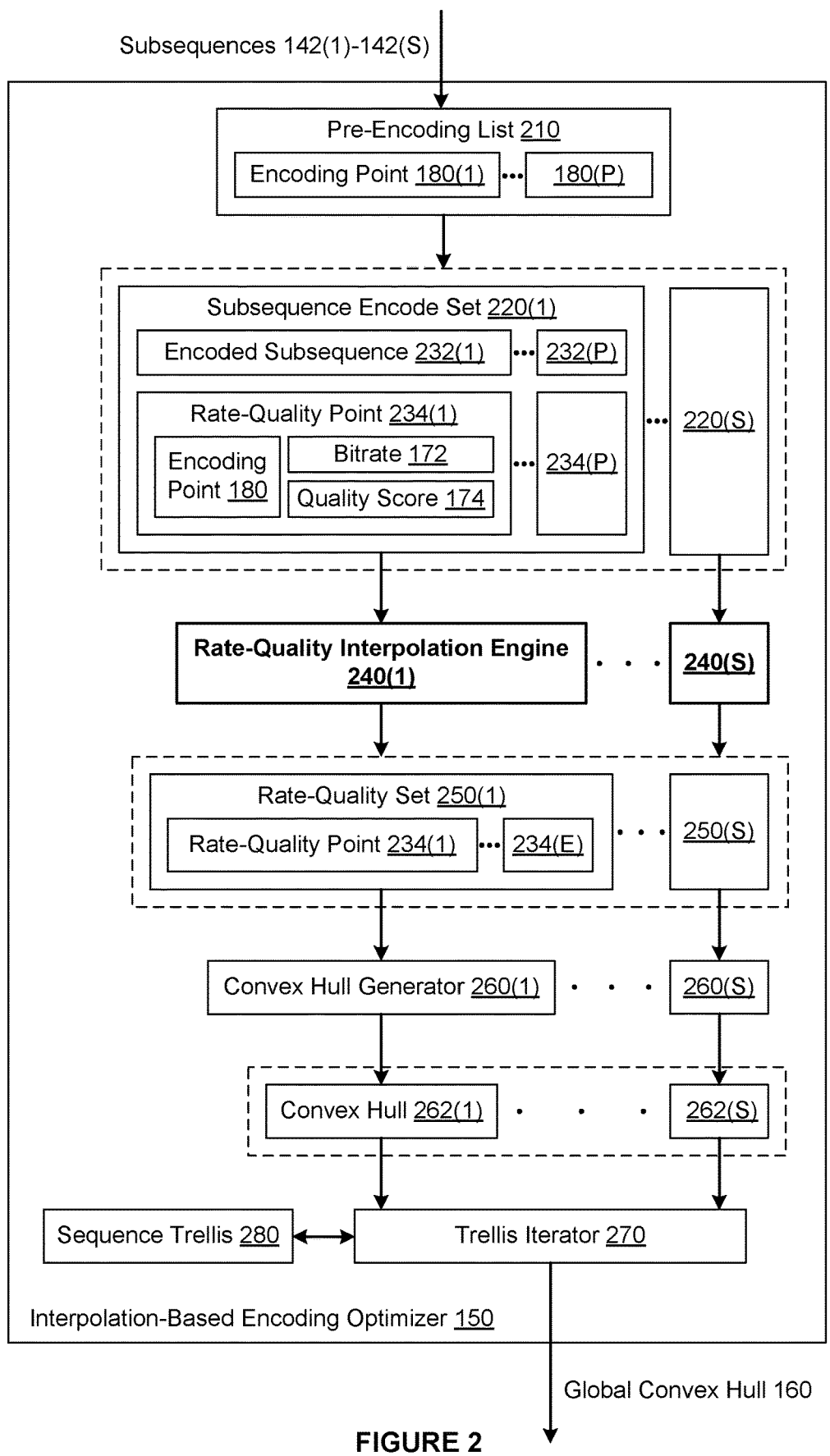
FIG. 2 is a more detailed illustration of the interpolation-based encoding optimizer of FIG. 1, according to various embodiments.

FIG. 2 is a more detailed illustration of the interpolation-based encoding optimizer 150 of FIG. 1, according to various embodiments. The interpolation-based encoding optimizer 150 includes, without limitation, a pre-encoding list 210, subsequence encode sets 220, rate-quality interpolation engines 240, rate-quality sets 250, convex hull generators 260, convex hulls 262, a trellis iterator 270, and a sequence trellis 280. Each of the number of the subsequence encode sets 220, the number of the rate-quality sets 250, and the number of the convex hulls 262 is equal to the number of subsequences 142. In general, the subsequence 142(x) is associated with the subsequence encode set 220(x), the rate-quality set 250(x), and the convex hull 262(x).

As shown, the pre-encoding list 210 includes, without limitation, the encoding points 180(1)-180(P), where P may be any positive integer. Advantageously, the pre-encoding list 210 includes only a subset of the encoding points 180 that the interpolation-based encoding optimizer 150 is configured to evaluate when generating the global convex hull 160. The interpolation-based encoding optimizer 150 may generate the pre-encoding list 210 in any technically feasible fashion 210. For instance, in some embodiments, the interpolation-based encoding optimizer 150 generates the pre-encoding list 210 based on data received via an application programming interface ("API") or a graphical user interface ("GUI").

In some embodiments, the interpolation-based encoding optimizer 150 generates the pre-encoding list 210 based on a QP interval and a resolution list, The interpolation-based encoding optimizer 150 determines the highest QP value 184, the middle QP value 184, and the lowest QP value 184 in the QP interval. For each resolution 182(z) specified in the resolution list, the interpolation-based encoding optimization 150 adds the encoding point 180 specifying the resolution 182(z) and the highest QP value 184, the encoding point 180 specifying the resolution 182(z) and the middle QP value 184, and the encoding point 180 specifying the resolution 182(z) and the lowest QP value 184 to the pre-encoding list 210.

For instance, in some embodiments, the QP interval is 20 to 40 (inclusive) and the resolution list includes the resolutions 182(1)-182(7) of 1920×1080, 1280×720, 960×540, 768×432, 608×342, 480×270, and 384×216, respectively. The interpolation-based encoding optimizer 150 generates the pre-encoding list 210 that includes twenty-one encoding points 180. Using the format (resolution 182, QP value 184) for explanatory purposes only, the encoding points 180 included in the pre-encoding list 210 are (1920×1080, 40), (1920×1080, 30), (1920×1080, 20), (1280×720, 40), (1280×720, 30), (1280×720, 20), (960×540, 40), (960×540, 30), (960×540, 20), (768×432, 40), (768×432, 30), (768×432, 20), (608×342, 40), (608×342, 30), (608×342, 20), (480×270, 40), (480×270, 30), (480×270, 20), (608×342, 40), 384×216, 40), (384×216, 30), and (384×216, 20).

As shown, each of the subsequence encode sets 220 includes, without limitation, encoded subsequences 232(1)-232(P) and rate-quality points 234(1)-234(P). Within each of the subsequence encode sets 220, each rate-quality point 234(y) includes, without limitation, the encoding point 180, the bitrate 172, and the quality score 174 associated with the encoded subsequence 232(y). Accordingly, the rate-quality point 234(y) included in the subsequence encode set 220(x) corresponds to the encoded subsequence 232(y) included in the subsequence encode set 220(x).

The interpolation-based encoding optimizer 150 generates the subsequence encode sets 220(1)-222(S) based on the subsequences 144(1)-144(S), respectively, and the pre-encoding list 210. To generate the encoded subsequence 232(y) included in the subsequence encode set 220(x), the interpolation-based encoding optimizer 150 encodes the subsequence 144(x) based on the encoding point 180(y) included in the pre-encoding list 210. The interpolation-based encoding optimizer 150 then computes the bitrate 172 and the quality score 174 associated with the encoded subsequence 232(y) included in the subsequence encode set 220(x). Subsequently, the interpolation-based encoding optimizer 150 generates a new rate-quality point 234 that specifies the encoding point 180, the bitrate 182, and the quality score 174 associated with the encoded subsequence 230(y) included in the subsequence encode set 220(x). The interpolation-based encoding optimizer 150 sets the rate-quality point 234(y) included in the subsequence encode set 220(x) equal to the new rate-quality point 234. In this fashion, the interpolation-based encoding optimizer 150 generates S*P encoded subsequences 232 and S*P corresponding rate-quality points 234.

The interpolation-based encoding optimizer 150 may compute the bitrates 172 and the quality scores 174 associated with the encoded subsequences 232 in any technically feasible fashion. For instance, in some embodiments, the interpolation-based encoding optimizer 150 may divide the total number of bits needed for the resolution 182 by the length of the associated subsequence 142 to determine the bitrate 172. In the same or other embodiments, to determine the quality score 174 associated with a given encoded subsequence 232, the interpolation-based encoding optimizer 150 decodes the encoded subsequence 232 to generate a decoded subsequence. The interpolation-based encoding optimizer 150 then re-samples (i.e., up-samples or down-samples) the decoded subsequence to a target resolution to generate a reconstructed subsequence that is relevant to the display characteristics of a class of endpoint devices.

The interpolation-based encoding optimizer 150 then analyzes the reconstructed subsequence to determine the quality score 174 associated with a visual quality metric. For instance, in some embodiments the interpolation-based encoding optimizer 150 implements a VMAF (or harmonic VMAF) algorithm to generate a VMAF score for each encoded subsequence 232 based on the associated reconstructed subsequence. Although a multitude of video quality metrics, such as VMAF scores, can be calculated at different target resolutions, it should be clear that, when comparing quality scores 174 among encoded subsequences 232 associated with different resolutions 182, applications need to use the same target resolution for re-sampling, after decoding.

As shown, the rate-quality interpolation engines 240(1)-240(S) generate the rate-quality sets 250(1)-250(S) based on the subsequence encode sets 220(1)-220(S). The rate-quality interpolation engines 240 may execute concurrently, sequentially, or any combination thereof. In alternate embodiments, any number of the rate-quality interpolation engines 240 may generate the rate-quality sets 250(1)-250(S). For instance, in some alternate embodiments, the rate-quality interpolation engine 240(1) sequentially generates the rate-quality sets 250(1)-250(S).

The rate-quality set 250(x) includes, without limitation, the rate-quality points 234(1)-234(E) associated with subsequence 144(x), where E may be any integer that is greater than the number of encoding points 180 included in the pre-encoding list 210. To generate the rate-quality set 250(x) the rate-quality interpolation engine 240(x) copies the rate-quality points 234(1)-234(P) included in the subsequence encode set 220(x) to the rate-quality set 250(x). In addition, the rate-quality interpolation engine 240(x) performs interpolation operations based on the rate-quality points 234(1)-

234(P) included in the subsequence encode set 220(x) to generate the rate-quality points 234(P+1)-234(E) included in the rate-quality set 250(x). As a result, the rate-quality set 250(x) includes P initial rate-quality points 234 that correspond to existing encoded subsequences 232. The rate-quality set 250(x) also includes (E-P) interpolated rate-quality points 234 that do not correspond to any of the existing encoded subsequences 232.

Figure 3:
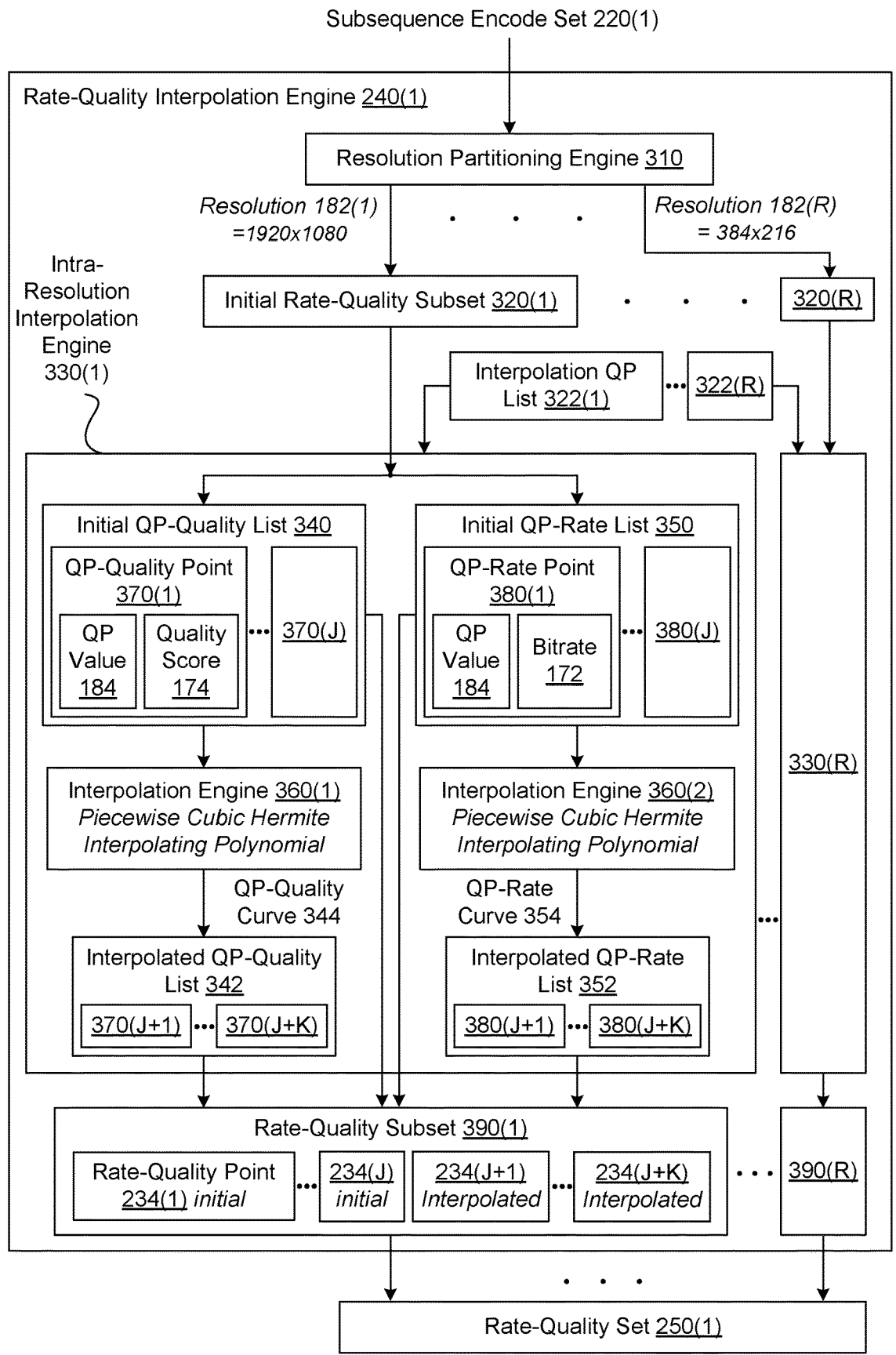
FIG. 3 is a more detailed illustration of one of the rate-quality interpolation engines of FIG. 2, according to various embodiments.

As described in greater detail in conjunction with FIG. 3, the rate-quality interpolation engine 240(x) implements intra-resolution interpolation techniques to generate the interpolated rate-quality points 234 that are included in the rate-quality set 250(x). More precisely, the rate-quality interpolation engine 240(x) distributes the rate-quality points 234 included in the subsequence encode set 230(x) into initial rate-quality subsets (not shown in FIG. 1), where each initial rate-quality subset is associated with a different resolution 182 (e.g., one of the resolutions 182 included in the resolution list).

For each resolution 182, the rate-quality interpolation engine 240(x) performs interpolation operations based on the associated initial rate-quality subset to generate any number of interpolated rate-quality points 234. The rate-quality interpolation engine 240(x) then adds the interpolated rate-quality points 234 to the rate-quality set 250(x). Notably, each of the rate-quality points 234 included in the rate-quality set 250(x) is associated with a different encoding point 180. Furthermore, neither the convex hull generator 260 nor the trellis iterator 270 differentiates between the initial rate-quality points 234 and the interpolated rate-quality points 234.

As shown, the convex hull generators 260(1)-260(S) generate the convex hull 262(1)-262(S) based on the rate-quality sets 250(1)-250(S). The convex hull generators 260(1)-260(S) may execute concurrently, sequentially, or any combination thereof. In alternate embodiments, any number of the convex hull generators 260 may generate the convex hulls 262(1)-262(S). For instance, in some alternate embodiments, the convex hull generator 260(1) sequentially generates the convex hulls 262(1)-262(S).

Each of the convex hulls 262(x) includes, without limitation, the rate-quality points 234 included in the rate-quality set 250(x) that minimize the bitrate 182 for a given quality score 184. Persons skilled in the art will understand that many techniques for generating convex hulls are well known in the field of mathematics, and the convex hull generator 260 may implement any number of such techniques to generate the convex hulls 262. For instance, in some embodiments, the convex hull generator 260 applies machine-learning techniques to estimate the rate-quality points 234 included in the convex hull 262(x) based on various parameters of the associated source video sequence 122.

In other embodiments, the convex hull generator 260(x) distributes the rate-quality points 234 included in the rate-quality set 250(x) into different subsets based on the resolution 182. Subsequently, for each resolution-specific subset, the convex hull generator 260(x) plots each of the rate-quality points 234 by locating the bitrate 172 along a bitrate axis and the quality score 174 along a quality axis to generate a corresponding rate-quality curve (not shown in FIG. 2). In this fashion, the convex hull generator 260(x) generates any number of rate-quality curves, where each of the rate-quality curves corresponds to a different resolution 182 and includes one or more rate-quality points 234.

After generating the rate-quality curves, the convex hull generator 260(x) evaluates the rate-quality points 234 along the rate-quality curves to determine the convex hull 262(x). More specifically, the convex hull generator 260(x) identifies the rate-quality points 234 across all the rate-quality curves that form a boundary where all the rate-quality points 234 reside on one side of the boundary and also are such that connecting any two consecutive identified rate-quality points 234 with a straight line leaves all remaining rate-quality points 234 on the same side. The convex hull 262(x) includes the set of the identified rate-quality points 234.

As shown, the trellis iterator 270 receives the convex hulls 262(1)-262(S) and then iteratively updates a sequence trellis 280 to generate the global convex hull 160 that includes, without limitation, any number of encoding recipes 170. As described previously herein in conjunction with FIG. 1, each of the encoding recipes 170(x) includes, without limitation, the bitrate 172 associated with the encoding recipe 170(x), the quality score 174 associated with the encoding recipe 170(x), and a different encoding point 180 for each of the subsequences 142. The trellis iterator 270 is a software module, and the sequence trellis 280 is a data structure. The trellis iterator 270 and the sequence trellis 280 are described in greater detail below in conjunction with FIGS. 5A-5D.

Interpolating Bitrates and Quality Scores Between Encoding Points

FIG. 3 is a more detailed illustration of one of the rate-quality interpolation engines 240 of FIG. 2, according to various embodiments. More precisely, FIG. 3 depicts the rate-quality interpolation engine 240(1) that generates the rate-quality set 250(1) based on the subsequence encode set 220(1). Both the rate-quality set 250(1) and the subsequence encode set 220(1) are associated with the subsequence 142(1).

As shown, the rate-quality interpolation engine 240(1) includes, without limitation, a resolution partitioning engine 310, initial rate-quality subsets 320(1)-320(R), interpolation QP lists 322(1)-322(R), intra-resolution interpolation engines 330(1)-330(R), and rate-quality subsets 390(1)-390(R), where R is the number of different resolutions 182 represented in the pre-encoding list 210.

The resolution partitioning engine 310 distributes the rate-quality points 234 included in the subsequence encode set 220(1) into the initial rate-quality subsets 320(1)-320(R), based on the resolutions 182. For instance, in some embodiments, the resolutions 182(1)-182(7) of 1920×1080, 1280×720, 960×540, 768×432, 608×342, 480×270, and 384×216, respectively, are represented in the pre-encoding list 210. The resolution partitioning engine 310 therefore distributes the rate-quality points 234 included in the subsequence encode set 220(1) into the initial rate-quality subsets 320(1)-320(7) that are associated with the resolutions 182(1)-182(7) of 1920×1080, 1280×720, 960×540, 768×432, 608×342, 480×270, and 384×216, respectively. For explanatory purposes only, the rate-quality points 234 included in the subsequence encode sets 320 are also referred to herein as "initial" rate-quality points 234.

The interpolation QP list 322(x) includes, without limitation, any number of QP values 184 that are within the range of but not included in the QP values 184 associated with the initial rate-quality subset 320(x). The rate-quality interpolation engine 240(1) may generate the interpolation QP list 322(x) in any technicality feasibly fashion. For instance, in some embodiments the rate-quality interpolation engine 240(1) may generate the interpolation QP list 322(x) based on input received via an API or a GUI.

In other embodiments, the rate-quality interpolation engine 240(1) generates the interpolation QP list 322(x) that includes every available QP value 184 that is within the range of but not included in the QP values 184 associated with the initial rate-quality subset 320(x). For example, suppose that the initial rate-quality subset 320(1) included the rate-quality points 234(1)-234(3) associated with the QP values 184 of 20, 30, and 40. The rate-quality interpolation engine 240(1) would generate the interpolation QP list 322(1) that included the QP values 184 of 21-29 and 31-39.

In some alternate embodiments, the rate quality interpolation engine 240(1) generates a single interpolation QP list 322 that is shared by the intra-resolution interpolation engines 330(1)-330(R). In other alternate embodiments, the intra-resolution interpolation engine 330(x) generates the interpolation QP list 322(x) before or while performing interpolation operations based on the initial rate-quality subset 320(x). In yet other embodiments, the interpolation-based encoding optimizer 150 generates a single interpolation QP list 322 that is shared by the rate-quality interpolation engines 240(1)-240(S).

In general, the intra-resolution interpolation engines 330(1)-330(R) generate the rate-quality subsets 390(1)-390(R) based on the initial rate-quality subsets 320(1)-320(R) and the interpolation QP lists 322(1)-322(R). In particular, the intra-resolution interpolation engine 330(x) generates the rate-quality subset 390(x) based on the initial rate-quality subset 320(x) and the interpolation QP list 322(x). The intra-resolution interpolation engines 330 may execute concurrently, sequentially, or any combination thereof. In alternate embodiments, any number of intra-resolution interpolation engines 330 may generate the rate-quality subsets 390(1)-390(R). For instance, in some alternate embodiments, the intra-resolution interpolation engine 330(1) sequentially generates the rate-quality subsets 390(1)-390(R).

As shown, the intra-resolution interpolation engine 330(x) includes, without limitation, an initial QP-quality list 340, interpolation engines 360(1)-360(2), an interpolated QP-quality list 342, an initial QP-rate list 350, and an interpolated QP-rate list 352. The intra-resolution interpolation engine 330(x) generates the initial QP-quality list 340 based on the initial rate-quality subset 320(x). The initial QP-quality list 340 includes, without limitation, QP-quality points 370(1)-370(J), where J is the number of rate-quality points 234 included in the initial rate-quality subset 320(x). The QP-quality point 370(y) includes, without limitation, the QP value 184 and the quality score 174 associated with the rate-quality point 234(y) included in the initial rate-quality subset 320(x).

Subsequently, the interpolation engine 360(1) performs interpolation operations based on the initial QP-quality list 340 to generate a QP-quality curve 344 and an interpolated QP-quality list 342. The interpolated QP-quality list 342 includes, without limitation, the QP-quality points 370(J+1)-370(J+K), where K is the number of QP values included in the interpolation QP list 322(x). The QP-quality point 370(J+i)-corresponds to the $i^{th}$ QP value 184 included in the interpolation QP list 322(x).

In some embodiments, the interpolation engine 360(1) performs Piecewise Cubic Hermite Interpolating Polynomial ("PCHIP") interpolation on the initial QP-quality points 370(1)-370(J) included in the initial QP-quality list 340 to generate the interpolated QP-quality points 370(J+1)-370(J+K) included in the interpolated QP-quality list 342. In some embodiments, as part of the PCHIP interpolation, the interpolation engine 360(1) sets the slope at each interior point as the weighted harmonic mean of the adjacent intervals and uses one-sided estimates at the borders. In addition, the interpolation engine 360(1) sets the derivative to zero when the signs of the adjacent intervals do not match.

In alternate embodiments, the interpolation engine 360(1) may impose any number and type of conditions on the PCHIP interpolation. In the same or other alternate embodiments, the interpolation engine 360(1) may perform any number and type of interpolation operations instead of or in addition to PCHIP interpolation operations to generate the interpolated QP-quality list 342. Some examples of different types of interpolation operations include, without limitation, linear interpolation operations, quadratic interpolation operations, cubic interpolation operations, Akima spline operations, cubic spline operations, and so forth.

As shown, the intra-resolution interpolation engine 330(x) generates the initial QP-rate list 350 based on the initial rate-quality subset 320(x). The initial QP-rate list 350 includes, without limitation, QP-rate points 380(J+1)-380(J+K), where J is the number of rate-quality points 234 included in the initial rate-quality subset 320(x). The QP-rate point 380(y) includes, without limitation, the QP value 184 and the bitrate 172 associated with the rate-quality point 234(y) included in the initial rate-quality subset 320(x).

The interpolation engine 360(2) then performs interpolation operations based on the initial QP-rate list 350 to generate a QP rate curve 354 and the interpolated QP-rate list 352. As shown, the interpolated QP-rate list 352 includes, without limitation, the QP-rate points 380(J+1)-380(J+K), where K is the number of QP values 182 included in the interpolation QP list 322(x). The QP-rate point 380(J+i)-corresponds to the $i^{th}$ QP value 184 included in the interpolation QP list 322(x). The functionality of the interpolation engine 360(2) is the same as the functionality of the interpolation engine 360(1) described previously herein in conjunction.

As shown, the intra-resolution interpolation engine 330(x) generates the rate-quality subset 390(x) based on the initial rate-quality subset 320(x), the interpolated QP-quality list 342, and the interpolated QP-rate list 352. More specifically, the intra-resolution interpolation engine 330(y) adds each of the initial rate-quality points 234(1)-234(J) included in the initial rate-quality subset 320(x) to the rate-quality subset 390(x).

In addition, the intra-resolution interpolation engine 330(x) combines the QP-quality points 370(J+1)-370(J+K) included in the interpolated QP-quality list 342 and the QP-rate points 380(J+1)-380(J+K) included in the interpolated QP-rate list 352 to generate the interpolated rate-quality points 234(J+1)-234(J+K) included in the rate-quality subset 390(x). In alternate embodiments, the intra-resolution interpolation engine 330(x) combines the QP-quality curve 344 and the QP-rate curve 354 to generate a rate-quality curve (not shown in FIG. 3) and then determines the interpolated rate-quality points 234(J+1)-234(J+K) included in the rate-quality subset 390(x) based on the rate-quality curve.

Subsequently, the rate-quality interpolation engine 240(1) sets the rate-quality set 250(1) equal to the union of the rate-quality subsets 390(1)-390(R). Notably, the rate-quality set 250(1) includes a mixture of initial rate-quality points 234 and interpolated rate-quality points 234. Furthermore, neither the convex hull generator 260 nor the trellis iterator 270 distinguish between the initial rate-quality points 234 and interpolated rate-quality points 234. Consequently, the rate-quality interpolation engine 240(1) increases the number of different QP values 184 that can be used to encode each of the subsequences 142 without increasing the number of encoded subsequences 232 needed to generate the global convex hull 160.

Figure 4:
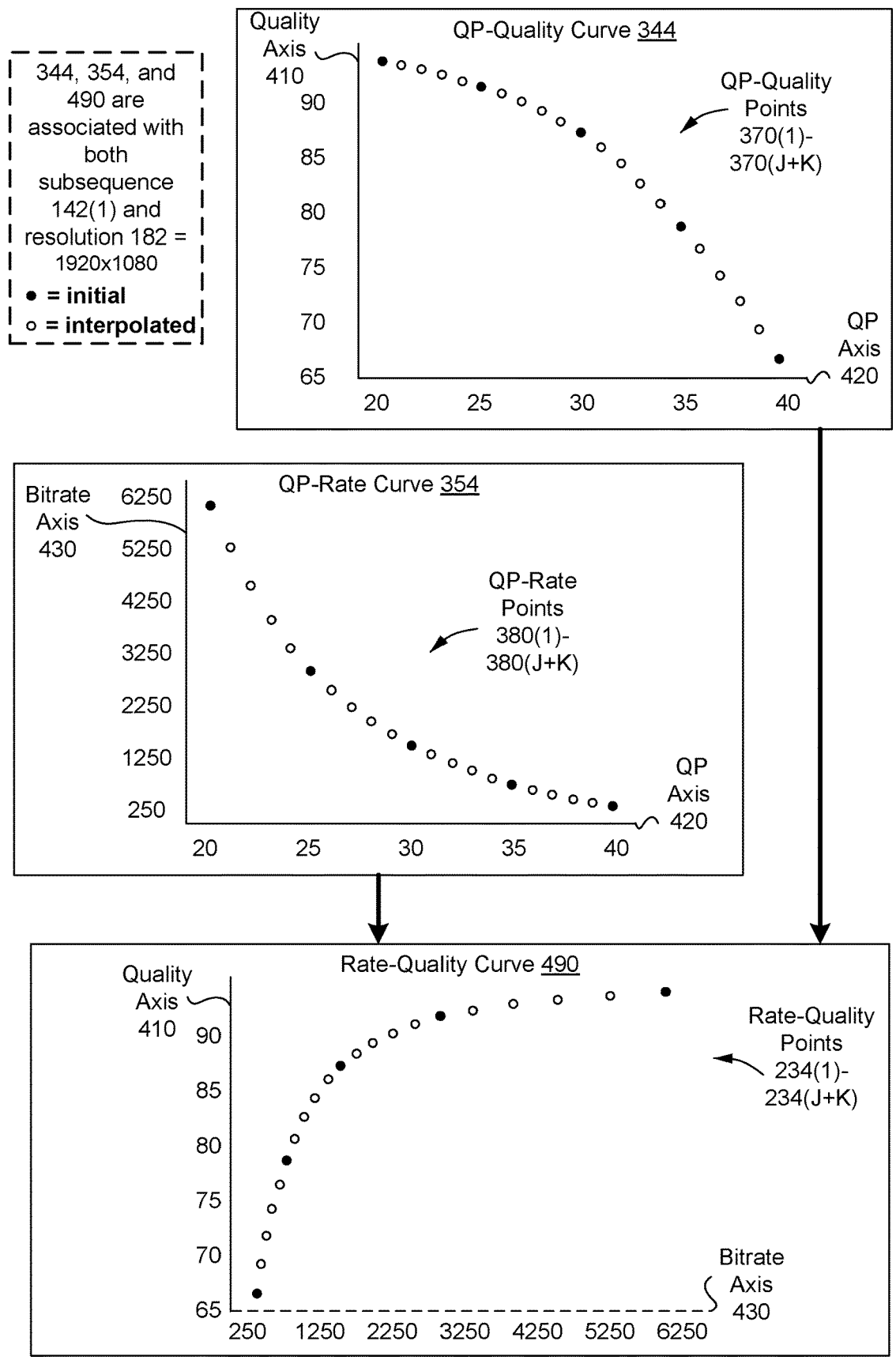
FIG. 4 illustrates exemplary curves that are generated by one of the intra-resolution interpolation engines of FIG. 3, according to various embodiments.

FIG. 4 illustrates exemplary curves generated by one of the intra-resolution interpolation engines 330 of FIG. 3, according to various embodiments. As described previously in conjunction with FIG. 3, the intra-resolution interpolation engine 330(1) generates the QP-quality curve 344 and the QP-rate curve 354 based on the initial rate-quality subset 320(1) that is associated with both the subsequence 142(1) and the resolution 182(1) of 1920×1080. The intra-resolution interpolation engine 330(1) then generates a rate-quality curve 490 based on the QP-quality curve 344 and the QP-rate curve 354.

The QP-quality curve 344 depicts the QP-quality points 370(1)-370(J) that are included in the initial QP-quality list 340 as filled circles. By contrast, the QP-quality curve 344 depicts the QP-quality points 370(J+1)-370(J+K) that the interpolation engine 360(1) generates based on the initial QP-quality list 340 as unfilled circles. The horizontal and vertical positions of each QP-quality point 370 correspond to the associated QP value 184 along a QP axis 420 and the associated quality score 174 along a quality axis 410, respectively. For explanatory purposes only, the quality score 174 increases as the level of quality increases and the level of quality decreases as the QP value 184 increases. Consequentially, if the QP value 184 included in the QP-quality point 370(a) is higher than the QP value 184 included in the QP-quality point 370(b), then the quality score 174 included in the QP-quality point 370(a) is lower than the quality score 174 included in the QP-quality point 370(b).

As shown, a QP-rate curve 354 depicts the QP-rate points 380(1)-380(J) that are included in the initial QP-rate list 350 as filled circles. By contrast, the QP-rate curve 354 depicts the QP-rate points 380(J+1)-380(J+K) that the interpolation engine 360(2) generates based on the initial QP-rate list 350 as unfilled circles. The horizontal and vertical positions of each QP-rate point 380 correspond to the associated QP value 182 along the QP axis 420 and the associated bitrate 172 along a bitrate axis 430, respectively. As shown, if the QP value 184 included in the QP-rate point 380(a) is higher than the QP value 184 included in the QP-rate point 380(b), then the bitrate 172 included in the QP-rate point 380(a) is lower than the bitrate 172 included in the QP-rate point 380(b)

In some embodiments, the intra-resolution interpolation engine 330 generates the rate-quality points 234(J+1)-(J+K) based on the QP-quality points 370(J+1)-(J+K) and the QP-rate point 380(J+1)-(J+K). More precisely, the intra-resolution interpolation engine 330(1) sets the bitrates 172 included in the rate-quality points 234(J+1)-(J+K) equal to the bitrates 172 included in the QP-rate points 380(J+1)-(J+K), respectively. In addition, the intra-resolution interpolation engine 330(1) sets the quality scores 174 included in the rate-quality points 234(J+1)-(J+K) equal to the quality scores 174 included in the QP-quality points 370(J+1)-(J+K), respectively.

The rate-quality curve 490 depicts the rate-quality points 234(1)-234(J) that are included in the initial rate-quality subset 320 as filled circles. By contrast, the rate-quality curve 490 depicts the rate-quality points 234(J+1)-370(J+K) as unfilled circles. The horizontal and vertical positions of each rate-quality points 234 correspond to the associated bitrate 172 along the bitrate axis 430 and the associated quality score 174 along the quality axis 410, respectively. As shown, if the bitrate 172 included in the rate-quality point 234(a) is higher than the bitrate 172 included in the rate-quality point 234(a), then the quality score 174 included in the rate-quality point 234(b) is higher than the quality score 174 included in the rate-quality point 234(b).

Generating Encoding Recipes

FIGS. 5A-5D are more detailed illustrations of how the trellis iterator 270 of FIG. 2 generates the encoding recipes 170 based on the rate-quality points 234, according to various embodiments. As shown in FIGS. 5A-5D, the sequence trellis 280 includes, without limitation, a shot axis 510 and the bitrate axis 430. The sequence trellis 280 also includes, without limitation, columns of the rate-quality points 234 included in the convex hulls 262, where each column corresponds to a particular subsequence 142. For example, the first column included in the sequence trellis 280 corresponds to the rate-quality points 234 included in the convex hull 262(1). The rate-quality points 234 included in any column are ranked according to ascending bitrate 172 (and, by construction, ascending quality scores 174). The "hull" rate-quality points 234 included in any column are also guaranteed to have positive slopes that—in magnitude—are increasing as a function of the bitrate 172.

For convenience, the hull rate-quality points 234 are individually indexed according to the following system. For a given hull rate-quality point 234, the first number is an index of the subsequence 142, and the second number is an index into the bitrate ranking of those hull rate-quality points 234. For example, the hull rate-quality point 234 11 corresponds to the first subsequence 142(1) and the first-ranked bitrate 172. Similarly, the hull rate-quality point 234 54 corresponds to the fifth subsequence 142(5) and the fourth-ranked bitrate 172 (in this case the highest-ranked bitrate 172).

As previously described in conjunction with FIG. 2, each hull rate-quality point 234 included within the sequence trellis 280 includes, without limitation, one of the encoding points 180 and is associated with one of the subsequences 142. The trellis iterator 270 generates each encoding recipe 170 that is included in the global convex hull by 260 by selecting combinations of the rate-quality points 234 such that each subsequence 142 is associated with one of the encoding points 180. The trellis iterator 270 implements the sequence trellis 280 to iteratively perform this combining technique, generating a different encoding recipe 170 during each iteration.

Each of FIGS. 5A-5D illustrates a different version of the sequence trellis 280 generated by the trellis iterator 270 at a different iteration. FIG. 5A illustrates the sequence trellis 280(1) in an initial state. Here, the trellis iterator 270 selects the hull rate-quality points 234 11, 21, 31, 41, and 51. These initially selected hull rate-quality points 234 have the lowest bitrate 172 and lowest quality scores 174, and therefore reside at the bottom of the respective columns.

The trellis iterator 270 sequentially adds the encoding points 180 included in the hull rate-quality points 234 11, 21, 31, 41, and 51 to the encoding recipe 170(1). In addition, the trellis iterator 270 computes the bitrate 172 included in the encoding recipe 170(1) based on the lengths of the subsequences 142(1)-142(5) and the bitrates 172 included in the hull rate-quality points 234 11, 21, 31, 41, and 51. The trellis iterator 270 also computes the quality score 174 included in the encoding recipe 170(1) based on the lengths of the subsequences 142(1)-142(5) and the quality scores 174 included in the hull rate-quality points 234 11, 21, 31, 41, and 51. The trellis iterator 270 may compute the quality score 174 included in the encoding recipe 170(1) in any technically feasible fashion that is consistent with the quality metric associated with the rate-quality points 234

The trellis iterator 270 then computes, for each of the selected hull rate-quality points 234 11, 21, 31, 41, and 51, the rate of change of the quality score 174 with respect to the bitrate 172 between the hull rate-quality point 234 and the above-neighbor of the hull rate-quality point 234. For example, the trellis iterator 270 could compute the rate of change of the quality score 174 with respect to the bitrate 172 between the rate-quality points 234 11 and 12, 21 and 22, 31 and 32, 41 and 42, and 51 and 52. Notably, the computed rate of change for the hull rate-quality point 234 associated with a particular subsequence 142 represents the derivative of an overall rate/quality curve associated with that subsequence 142, taken at the hull rate-quality point 234.

The trellis iterator 270 selects the derivative having the greatest magnitude, and then selects the above neighbor associated with that derivative to generate a subsequent encoding recipe 170. For example, in FIG. 5B, the trellis iterator 270 determines that the derivative associated with hull rate-quality point 234 41 is greatest, and therefore selects the hull rate-quality point 234 42 (the above-neighbor of the hull rate-quality point 234 41) to generate the encoding recipe 170(2).

As shown, the trellis iterator 270 sequentially adds the encoding points 180 included in the hull rate-quality points 234 11, 21, 31, 42, and 51 to the encoding recipe 170(2). In addition, the trellis iterator 270 computes the bitrate 172 included in the encoding recipe 170(2) based on the lengths of the subsequences 142(1)-142(5) and the bitrates 172 included in the hull rate-quality points 234 11, 21, 31, 42, and 51. The trellis iterator 270 also computes the quality score 174 included in the encoding recipe 170(2) based on the lengths of the subsequences 142(1)-142(5) and the quality scores 174 included in the hull rate-quality points 234 11, 21, 31, 42, and 51.

The trellis iterator 270 performs this technique iteratively, thereby ascending the sequence trellis 280, as shown in FIGS. 5C-5D. In FIG. 5C, the trellis iterator 270 determines that the derivative associated with the hull rate-quality point 234 11 is greatest compared to other derivatives, and therefore selects the hull rate-quality point 234 12 to generate the encoding recipe 170(3).

The trellis iterator 270 continues this process until, as shown in FIG. 5D, the trellis iterator 270 generates the encoding recipe 170(16) based on the hull rate-quality points 234 14, 24, 34, 44, and 54. In this manner, the trellis iterator 270 incrementally improves the encoding recipe 170 by selecting a single hull rate-quality point 234 for which both the bitrate 172 and the quality score 174 are increased. As a result, the global convex hull 160 corresponds to a collection of encoding recipes 170 with increasing bitrate 172 and increasing quality score 174. In alternate embodiments, the global convex hull 160 may be generated based on the convex hulls 262 in any technically feasible fashion.

In alternate embodiments, the trellis iterator 270 adds hull rate-quality points 234 prior to ascending the sequence trellis 280 in order to create a terminating condition. In doing so, the trellis iterator 270 may duplicate hull rate-quality points 234 having the greatest bitrate 172 to cause the rate of change between the second to last and the last hull rate-quality points 234 to be zero. When the trellis iterator 280 detects this zero rate of change for all the subsequences 142, i.e., when the maximum magnitude of rate of change is exactly zero, the trellis iterator 270 identifies the terminating condition and stops iterating.

Generating Optimized Encoded Media Sequences

Figure 6:
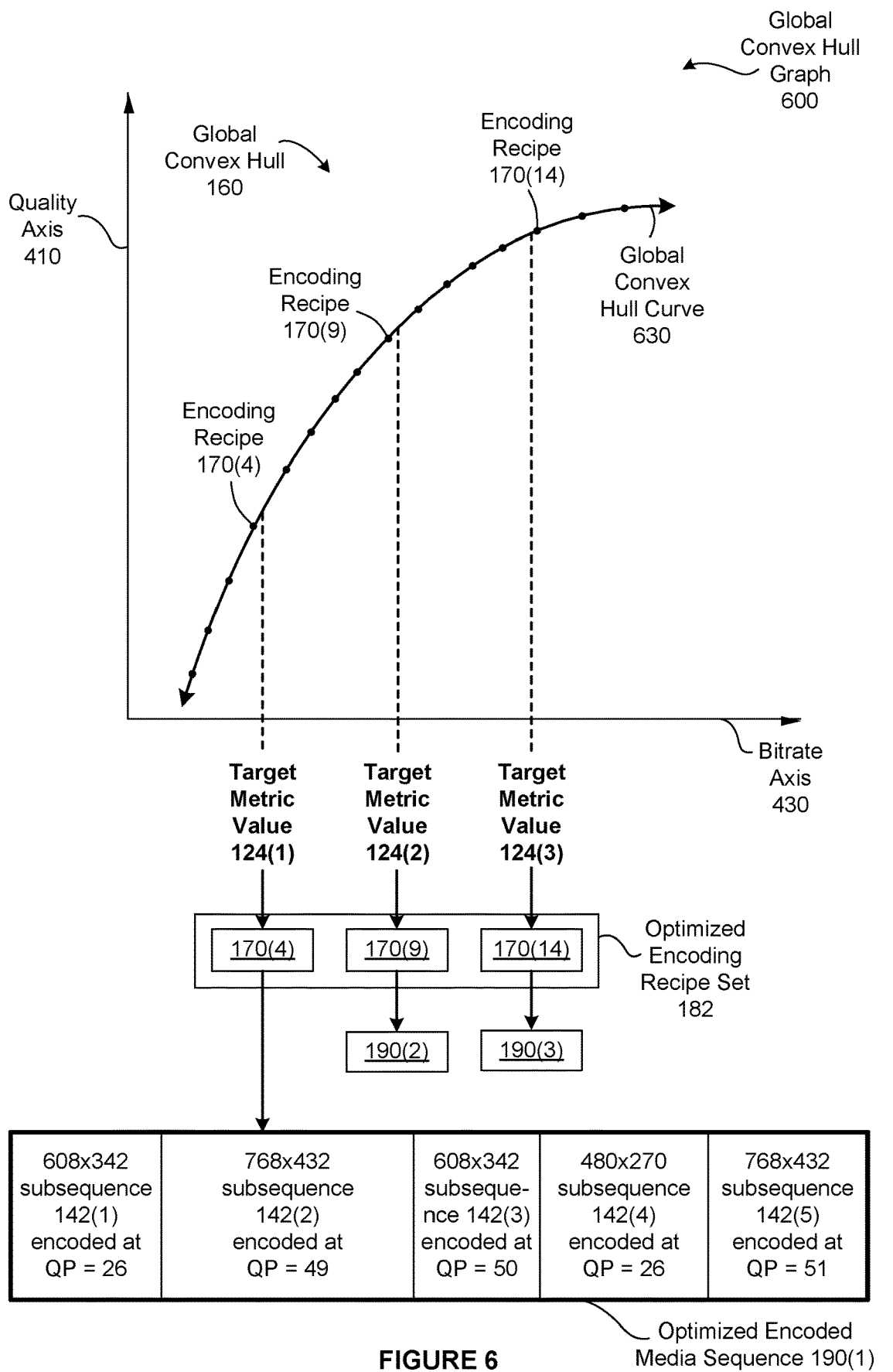
FIG. 6 illustrates how the assembly engine of FIG. 1 generates optimized encoded media sequences based on an exemplary global convex hull.

FIG. 6 illustrates how the assembly engine 180 of FIG. 1 generates the optimized encoded media sequences 190 based on an exemplary global convex hull 160. As described in detail previously in conjunction with FIGS. 5A-5D, the trellis iterator 270 generates the encoding recipes 170 included in the global convex hull 160 in an ascending manner to increase both the quality score 174 and the bitrate 172. Consequently, the encoding recipes 170 span a range from a low quality score 174 and a low bitrate 172 to a high quality score 174 and a high bitrate 172.

The assembly engine 180 plots the different encoding recipes 170 included in the global convex hull 160 against the bitrate axis 430 and the quality axis 410, to generate a global convex hull graph 600. The assembly engine 180 then connects the points corresponding to the encoding recipes 170 included in the global convex hull 160 to generate a global convex hull curve 630. Accordingly, the global convex hull curve 630 represents the quality score 174 as a function of the bitrate 172 across all the encoding recipes 170.

Based on the global convex hull curve 630, the assembly engine 180 can select, for a given bitrate 172, the encoding recipe 170 that maximizes the quality score 174. Conversely, the assembly engine 180 can select, for a given quality score 174, the encoding recipe 170 that minimizes the bitrate 172 for the given quality score 174. In operation, for each target metric value 124($x$), the assembly engine 180 selects the encoding recipe 170 having the metric value that lies closest to the target metric value 124($x$) and adds the selected encoding recipe 170 to the optimized encoding recipe set 182. Each target metric value 124 may be a target bitrate 172, a target quality score 174, or a target distortion level (not shown), to name a few.

Subsequently, the assembly engine 180 generates the optimized encoded media sequences 190 based on the optimized encoding recipe set 182, the subsequences 142, and the encoded subsequences 232. To generate the optimized encoded media sequence 190($x$) corresponding to the target metric value 124($x$), the assembly engine 180 selects the $x^{th}$ encoding recipe 170 included in the optimized encoding recipe set 182. For each subsequence 142($y$), the assembly engine 180 acquires (and stores in the memory 116) the $y^{th}$ "constituent" encoded subsequence 232 that is associated with both the subsequence 142($y$) and the $y^{th}$ encoding point 180 included in the selected encoding recipe 170. The assembly engine 180 sets the encoded media sequence 170($x$) equal to the 1st constituent encoded subsequence 232 and then sequentially appends the $2^{nd}$-$S^{th}$ constituent encoded subsequences 232 to the encoded media sequence 170($x$).

The assembly engine 180 may acquire the $y^{th}$ constituent encoded subsequence 232 in any technically feasible fashion. For instance, if the $y^{th}$ encoding point 180 included in the selected encoding recipe 170 is also included in the pre-encoding list 210, then the assembly engine 180 reads the $y^{th}$ constituent encoded subsequence 232 from the memory 116. Otherwise, if the assembly engine 180 has already generated the $y^{th}$ constituent encoded subsequence 232 for a different optimized encoded media sequence 190, then the assembly engine 180 reads the $y^{th}$ constituent encoded subsequence 232 from the memory 116. Otherwise, the assembly engine 180 configures the encoder 152 to encode the subsequence 142(y) at the $y^{th}$ encoding point 180 included in the selected encoding recipe 170 to generate the $y^{th}$ constituent encoded subsequence 232.

For exploratory purposes only, FIG. 6 depicts three target metric values 124(1)-124(3) that each specifies a different bitrate 172. As shown, the assembly engine 180 adds the encoding recipes 170(4), 170(9), and 170(14) to the optimized encoding recipe set 182 based on, respectively, the target metric values 124(1), 124(2), and 124(3). The assembly engine 180 then generates the optimized encoded media sequences 190(1)-190(3) based on the encoding recipe set 182. Notably, each optimized encoded media sequence 170(x) maximizes the quality score 174 for the bitrate 172 specified as the target metric value 124(x).

FIG. 6 also depicts an example of the optimized encoded media sequence 170(1). As shown, the optimized encoded media sequence 170(1) includes, without limitation, the encoded subsequence 232 derived from a 608×342 version of the subsequence 142(1) and encoded using the QP value 184 of 26, followed by the encoded subsequence 232 derived from a 768×432 version of the subsequence 142(2) and encoded using the QP value 184 of 49, followed by the encoded subsequence 232 derived from a 608×342 version of the subsequence 142(3) and encoded using the QP value 184 of 50, etc.

Figure 7A:
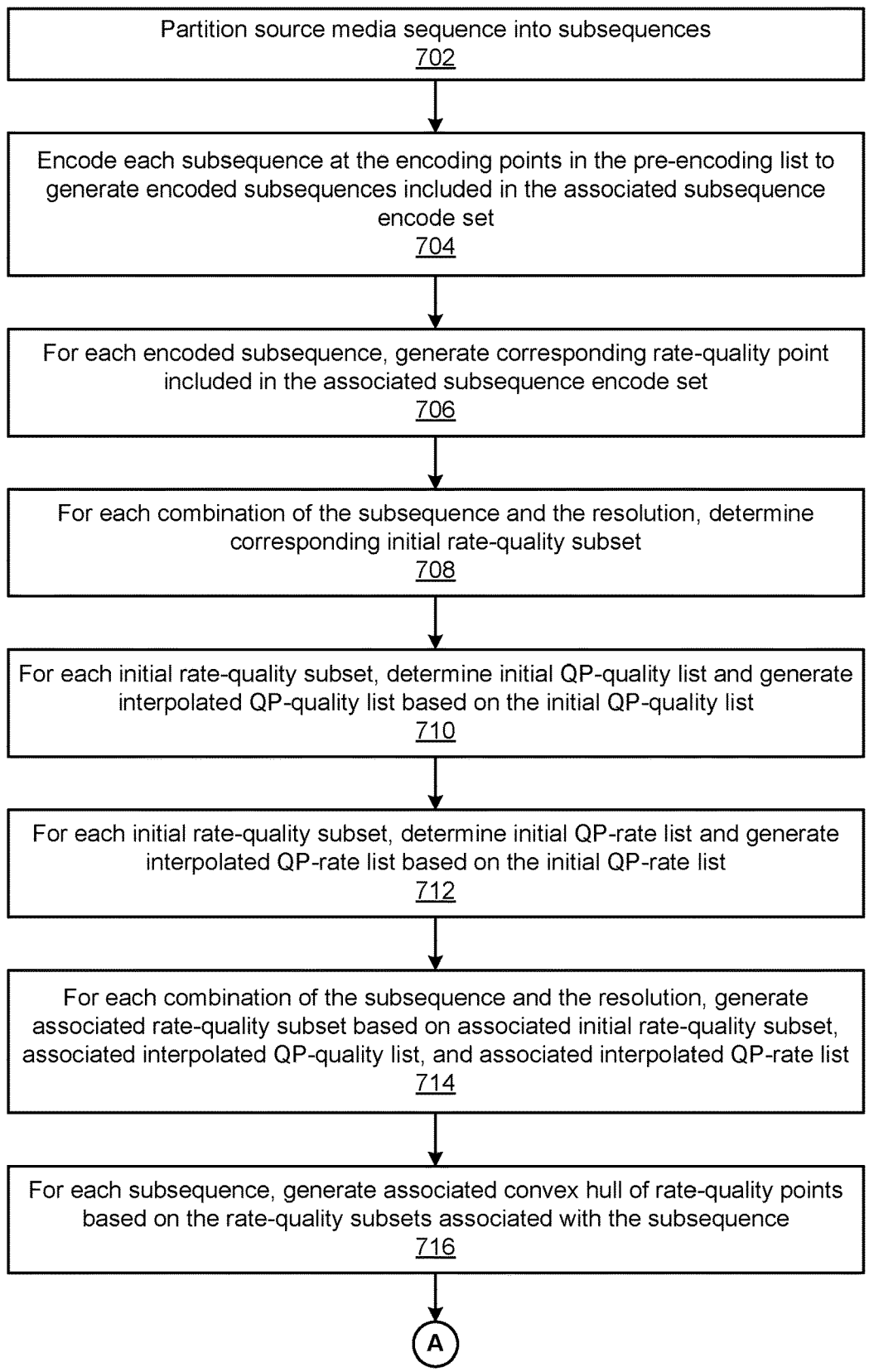
FIGS. 7A-7B set forth a flow diagram of method steps for encoding a media title, according to various embodiments.
Figure 7B:
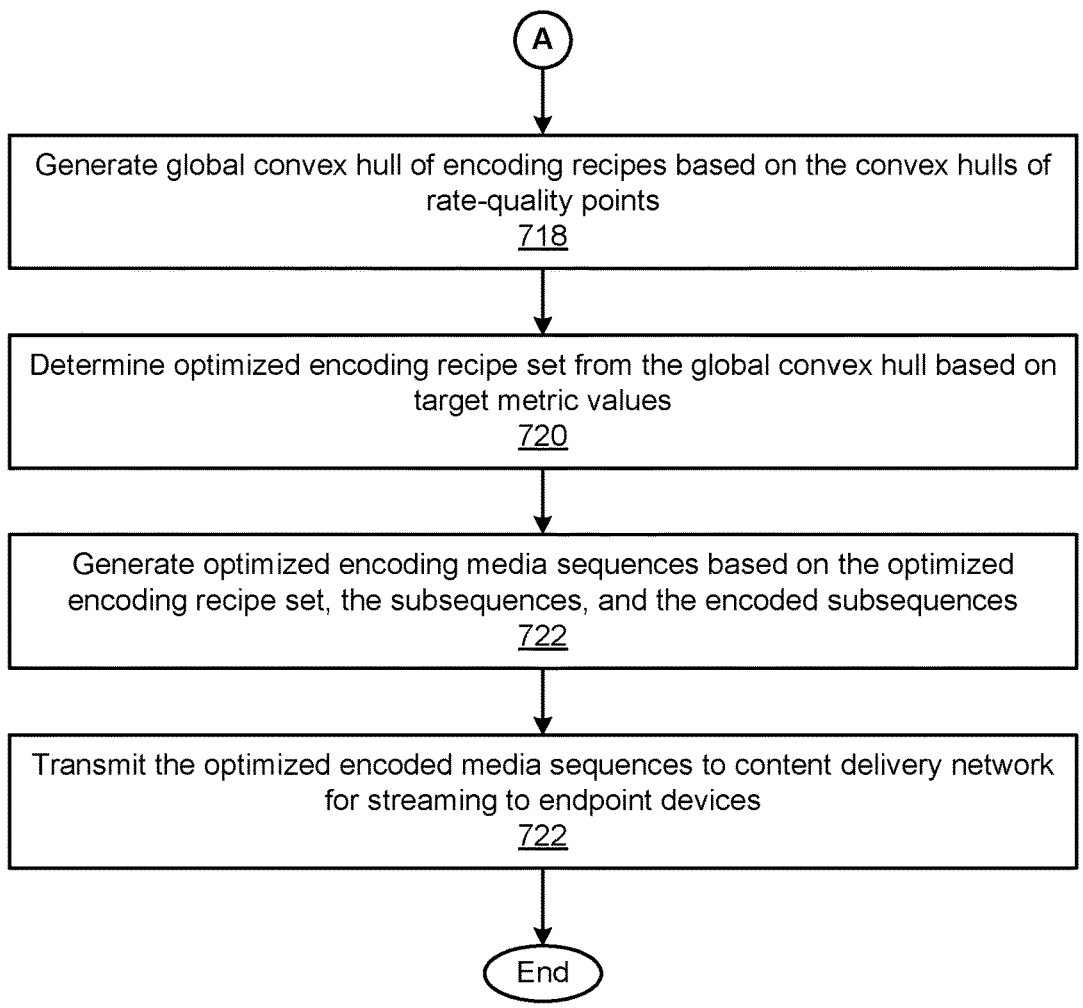

FIGS. 7A-7B set forth a flow diagram of method steps for encoding a media title, according to various embodiments. Although the method steps are described with reference to the systems of FIGS. 1-6, persons skilled in the art will understand that any system configured to implement the method steps, in any order, falls within the scope of the present invention.

As shown, a method 700 begins a step 702, where the partitioning engine 130 partitions the source media sequence 122 into the subsequences 142. At step 704, the interpolation-based encoding optimizer 150 encodes each subsequence 142(x) at the encoding points 180 included in the pre-encoding list 210 to generate the encoded subsequences 232 included in the subsequence encode set 220(x). At step 706, for each encoded subsequence 232, the interpolation-based encoding optimizer 150 generates the corresponding rate-quality point 234 included in the associated subsequence encode set 220.

At step 708, for each combination of the subsequence 142 and the resolution 182, the rate-quality interpolation engine 240 determine the corresponding initial rate-quality subset 320 from the subsequence encode set 220. At step 710, for each initial rate-quality subset 320, the intra-resolution interpolation engine 330 determines the initial QP-quality list 340 and generates the interpolated QP-quality list 342 based on the initial QP-quality list 340. At step 712, for each initial rate-quality subset 320, the intra-resolution interpolation engine 330 determines the initial QP-rate list 350 and then generates the interpolated QP-rate list 352 based on the initial QP-rate list 350.

At step 714, for each combination of the subsequence 142 and the resolution 182, the intra-resolution interpolation engine 330 generates the associated rate-quality subset 390 based on the associated initial rate-quality subset 320, the associated interpolated QP-quality list 342, and the associated interpolated QP-rate list 352. At step 716, for each subsequence 142(x), the convex hull generator 260 generates the convex hull 262(x) of rate-quality points 234 based on the rate-quality subsets 390 associated with the subsequence 142(x).

At step 718, the trellis iterator 270 generates the global convex hull 160 of encoding recipes 170 based on the convex hulls 262 of the rate-quality points 234. At step 720, the assembly engine 180 determines the optimized encoded recipe set 182 from the global convex hull 160 based on the target metric values 124. At step 722, the assembly engine 180 generates the optimized encoded media sequences 190 based on the optimized encoding recipe set 182, the subsequences 142, and the encoded subsequences 232.

At step 724, the assembly engine 180 transmits the optimized encoded media sequences 190 to the CDN 198 for streaming to endpoint devices. In alternate embodiments, the assembly engine 180 may transmit the optimized encoded media sequences 190 to any number of software applications instead of or in addition to the CDN 198. In the same or other alternate embodiments, the assembly engine 180 may transmit the optimized encoding recipe set 182 and, optionally, the encoded subsequences 232 specified in the encoding recipes 180 to any number of software applications. The method 700 then terminates.

Advantageously, the computational complexity associated with generating the optimized encoded recipe set 182 correlates to the number of encoding points 180 included in the pre-encoding list 210, not the number of different encoding points 180 represented by the rate-quality points 234. For example, referring back to FIG. 2, the media encode sequence 122 includes S subsequences 142 and the pre-encoding list 210 includes P encoding points 180. To generate the encoding recipes 170, the interpolation-based encoding optimizer 150 generates S*P encoded subsequences 232 irrespective of the number of interpolated encoding points 180 for which the interpolation-based encoding optimizer 150 generates interpolated rate-quality points 234.

In sum, the disclosed techniques enable efficient subsequence-based encoding of source media sequences. An interpolation-based encoding application includes, without limitation, a partitioning engine, an interpolation-based encoding optimizer, and an assembly engine. The partitioning engine partitions a source media sequence into multiple subsequences. For each subsequence, the interpolation-based encoding optimizer encodes the subsequence using the encoding points included in a pre-encoding list to generate multiple associated encoded subsequences. Each encoding point specifies a different combination of resolution and QP value and, therefore, each encoded subsequence is associated with a different combination of subsequence, resolution, and QP value. For each encoded subsequence, the interpolation-based encoding optimizer computes a rate-quality point that specifies, without limitation, the associated encoding point, bitrate, and quality level Subsequently, the interpolation-based encoding optimizer computes interpolated QP-quality points and interpolated QP-rate points based on the initial rate-quality points associated with the encoded subsequences to generate interpolated rate-quality points. The interpolation-based encoding optimizer then performs optimization operations on the rate-quality points to generate a global convex hull of encoding recipes, where each encoding recipe specifies a different encoding point for each subsequence. For each target metric value, the assembly engine selects one of the encoding recipes as an associated optimized encoding recipe. The assembly engine generates a different optimized encoded sequence based on each optimized encoding recipe and transmits the optimized encoded sequences to a CDN to distribution to endpoint devices.

At least one technological improvement of the disclosed techniques relative to the prior art is that the number of different encoding points that can be used in the encoding recipes is increased without increasing the time required to generate the encoding recipes. Allowing the encoding points to vary across each encoding recipe reduces the encoding inefficiencies typically associated with monolithic encoding techniques. Furthermore, maintaining or reducing the total number of encoded subsequences generated to determine the encoding recipes maintains or reduces the overall time and computation resources required to encode media title at one or more target bitrate(s) relative to prior art subsequence-based techniques. These technical advantages provide one or more technological advancements over prior art approaches.

1. In some embodiments, a computer-implemented method for encoding a media title comprises encoding a first subsequence included in the media title across a first plurality of encoding points to generate a first plurality of encoded subsequences, performing one or more interpolation operations based on the first plurality of encoded subsequences to estimate a first media metric value associated with a first encoding point that is not included in the first plurality of encoding points, generating a first encoding recipe that specifies a different encoded point for each subsequence included in the media title based on the first plurality of encoded subsequences and the first media metric value, determining that the first encoding recipe specifies the first encoding point for the first subsequence, and encoding the first subsequence at the first encoding point to generate at least a portion of a first encoded version of the media title.

2. The computer-implemented method of clause 1, a size, a peak signal-to-noise-ratio, a linear video multimethod assessment fusion metric, or a harmonic video multimethod assessment fusion.

3. The computer-implemented method of clauses 1 or 2, wherein each encoding point included in the first plurality of encoding points is associated with a different value of an encoding parameter.

4. The computer-implemented method of any of clauses 1-3, wherein the first media metric value comprises a first value of a visual quality metric, and performing the one or more interpolation operations comprises decoding the first plurality of encoded subsequences to generate a plurality of reconstructed subsequences, computing a plurality of values for the visual quality metric based on the plurality of reconstructed subsequences, and interpolating between two values included in the plurality of values for the visual quality metric to estimate the first value of the visual quality metric.

5. The computer-implemented method of any of clauses 1-4, wherein the first media metric value comprises a first bitrate, and performing the one or more interpolation operations comprises determining a plurality of bitrates based of the first plurality of encoded subseqeuences, and interpolating between two bitrates included in the plurality of bitrates to estimate the first bitrate.

6. The computer-implemented method of any of clauses 1-5, wherein generating the first encoding recipe comprises performing one or more interpolation operations based on the first plurality of encoded subsequences to estimate a first bitrate associated with the first encoding point, performing one or more optimization operations based on the first plurality of encoded subsequences, the first media metric value, and the first bitrate to generate a plurality of encoding recipes, and determining the first encoding recipe from the plurality of encoding recipes based on a first target bitrate or a first target value for the visual quality metric.

7. The computer-implemented method of any of clauses 1-6, further comprising determining a second encoding recipe from the plurality of encoding recipes based on a second target bitrate or a second target value for the visual quality metric, and generating a second encoded version of the media title based on the second encoding recipe.

8. The computer-implemented method of any of clauses 1-7, wherein generating the first encoding recipe comprises generating a first convex hull of rate-quality points based on the first plurality of encoded subsequences and the first media metric value, generating a global convex hull of encoding recipes based on the first convex hull and a second convex hull that is associated with a second subsequence included in the media title, and determining the first encoding recipe from the global convex hull based on a target bitrate or a target level of visual quality.

9. The computer-implemented method of any of clauses 1-8, wherein the at least a portion of the first encoded version of the media title comprises a first encoded subsequence, and the first encoded version of the media title is further generated by determining that the first encoding recipe specifies a second encoding point for a second subsequence included in the media title, determining that a second encoded subsequence is associated with both the second encoding point and the second subsequence, and aggregating the first encoded subsequence and the second encoded subsequence to generate at least an additional portion of the first encoded version of the media title.

10. The computer-implemented method of any of clauses 1-9, wherein the one or more interpolation operations comprise at least one Piecewise Cubic Hermite Interpolating operation, Polynomial interpolation operation, linear interpolation operation, quadratic interpolation operation, cubic interpolation operation, Akima spline operation, or cubic spline operation.

11. In some embodiments, one or more non-transitory computer readable media include instructions that, when executed by one or more processors, cause the one or more processors to encode a media title by performing the steps of encoding a first subsequence included in the media title across a first plurality of encoding points to generate a first plurality of encoded subsequences, performing one or more interpolation operations based on the first plurality of encoded subsequences to compute a plurality of estimated media metric values associated with a second plurality of encoding points, generating a first encoding recipe that specifies a different encoding point for each subsequence included in the media title based on the first plurality of encoded subsequences and the plurality of estimated media metric values, determining that the first encoding recipe specifies a first encoding point for the first subsequence, wherein the first encoding point is not included in the first plurality of encoding points, and encoding the first subsequence at the first encoding point to generate at least a portion of a first encoded version of the media title.

12. The one or more non-transitory computer readable media of clause 11, wherein each estimated media metric value included in the plurality of estimated media metric values comprises a different value for a bitrate, a size, a peak signal-to-noise-ratio, a linear video multimethod assessment fusion metric, or a harmonic video multimethod assessment fusion.

13. The one or more non-transitory computer readable media of clauses 11 or 12, wherein each encoding point included in the first plurality of encoding points is associated with a different value of an encoding parameter.

14. The one or more non-transitory computer readable media of any of clauses 11-13, wherein the plurality of estimated media metric values comprises a plurality of estimated values for a visual quality metric, and performing the one or more interpolation operations comprises decoding the first plurality of encoded subsequences to generate a plurality of reconstructed subsequences, computing a plurality of values for the visual quality metric based on the plurality of reconstructed subsequences, and interpolating between at least two values included in the plurality of values for the visual quality metric to compute the plurality of estimated values for the visual quality metric.

15. The one or more non-transitory computer readable media of any of clauses 11-14, wherein the plurality of estimated media metric values comprises a plurality of estimated bitrates, and performing the one or more interpolation operations comprises determining a plurality of bitrates based of the first plurality of encoded subseqeuences, and interpolating between at least two bitrates included in the plurality of bitrates to compute the plurality of estimated bitrates.

16. The one or more non-transitory computer readable media of any of clauses 11-15, wherein generating the first encoding recipe comprises performing one or more optimization operations based on the first plurality of encoded subsequences and the plurality of estimated media metric values to generate a plurality of encoding recipes, and determining the first encoding recipe from the plurality of encoding recipes based on a first target bitrate or a first target value for a visual quality metric.

17. The one or more non-transitory computer readable media of any of clauses 11-16, wherein the first plurality of encoding points is associated with a first resolution, and generating the first encoding recipe comprises generating a first convex hull of rate-quality points based on the first plurality of encoded subsequences, the plurality of estimated media metric values, and a second plurality of encoded subsequences that is associated with both the first subsequence and a second resolution, generating a global convex hull of encoding recipes based on the first convex hull and a second convex hull that is associated with a second subsequence included in the media title, and determining the first encoding recipe from the global convex hull based on a target bitrate or a target level of visual quality.

18. The one or more non-transitory computer readable media of any of clauses 11-17, wherein the at least a portion of the first encoded version of the media title comprises a first encoded subsequence, and the first encoded version of the media title is further generated by determining that the first encoding recipe specifies a second encoding point for a second subsequence included in the media title, encoding the second subsequence at the second encoding point to generate a second encoded subsequence, and aggregating the first encoded subsequence and the second encoded subsequence to generate at least an additional portion of the first encoded version of the media title.

19. The one or more non-transitory computer readable media of any of clauses 11-18, wherein the one or more interpolation operations comprise at least one Piecewise Cubic Hermite Interpolating operation, Polynomial interpolation operation, linear interpolation operation, quadratic interpolation operation, cubic interpolation operation, Akima spline operation, or cubic spline operation.

20. In some embodiments, a system comprises one or more memories storing instructions, and one or more processors that are coupled to the one or more memories and, when executing the instructions, are configured to partition a media title into a plurality of subsequences, encode a first subsequence included in the plurality of subsequences across a plurality of encoding points to generate a plurality of encoded subsequences perform one or more interpolation operations based on the plurality of encoded subsequences to estimate a first media metric value associated with a first encoding point that is not included in the plurality of encoding points, perform one or more optimization operations based on the plurality of encoded subsequences and the first media metric value to generate a first encoding recipe that specifies a different encoding point for each subsequence included in the plurality of subsequences, determine that the first encoding recipe specifies the first encoding point for the first subsequence, and encode the first subsequence at the first encoding point to generate at least a portion of a first encoded version of the media title.

Any and all combinations of any of the claim elements recited in any of the claims and/or any elements described in this application, in any fashion, fall within the contemplated scope of the embodiments and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program codec embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for encoding a media title, the method comprising:
    encoding a first subsequence included in the media title across a first plurality of encoding points to generate a first plurality of encoded subsequences;
    performing one or more interpolation operations based on the first plurality of encoded subsequences to estimate a first media metric value associated with a first encoding point that is not included in the first plurality of encoding points;
    generating a first encoding recipe that specifies a different encoding point for each subsequence included in the media title based on the first plurality of encoded subsequences and the first media metric value;
    determining that the first encoding recipe specifies the first encoding point for the first subsequence; and
    encoding the first subsequence at the first encoding point to generate at least a portion of a first encoded version of the media title.

2. The method of claim 1 wherein the first media metric value comprises a value for a bitrate, a size, a peak signal-to-noise-ratio, a linear video multimethod assessment fusion metric, or a harmonic video multimethod assessment fusion.

3. The method of claim 1, wherein each encoding point included in the first plurality of encoding points is associated with a different value of an encoding parameter.

4. The method of claim 1, wherein the first media metric value comprises a first value of a visual quality metric, and performing the one or more interpolation operations comprises:
    decoding the first plurality of encoded subsequences to generate a plurality of reconstructed subsequences;
    computing a plurality of values for the visual quality metric based on the plurality of reconstructed subsequences; and
    interpolating between two values included in the plurality of values for the visual quality metric to estimate the first value of the visual quality metric.

5. The method of claim 1, wherein the first media metric value comprises a first bitrate, and performing the one or more interpolation operations comprises:
    determining a plurality of bitrates based of the first plurality of encoded subseqeuences; and
    interpolating between two bitrates included in the plurality of bitrates to estimate the first bitrate.

6. The method of claim 1, wherein generating the first encoding recipe comprises:
    performing one or more interpolation operations based on the first plurality of encoded subsequences to estimate a first bitrate associated with the first encoding point;
    performing one or more optimization operations based on the first plurality of encoded subsequences, the first media metric value, and the first bitrate to generate a plurality of encoding recipes; and
    determining the first encoding recipe from the plurality of encoding recipes based on a first target bitrate or a first target value for the visual quality metric.

7. The method of claim 6, further comprising:
    determining a second encoding recipe from the plurality of encoding recipes based on a second target bitrate or a second target value for the visual quality metric; and
    generating a second encoded version of the media title based on the second encoding recipe.

8. The method of claim 1, wherein generating the first encoding recipe comprises:
    generating a first convex hull of rate-quality points based on the first plurality of encoded subsequences and the first media metric value;
    generating a global convex hull of encoding recipes based on the first convex hull and a second convex hull that is associated with a second subsequence included in the media title; and
    determining the first encoding recipe from the global convex hull based on a target bitrate or a target level of visual quality.

9. The method of claim 1, wherein the at least a portion of the first encoded version of the media title comprises a first encoded subsequence, and the first encoded version of the media title is further generated by:
    determining that the first encoding recipe specifies a second encoding point for a second subsequence included in the media title;
    determining that a second encoded subsequence is associated with both the second encoding point and the second subsequence; and
    aggregating the first encoded subsequence and the second encoded subsequence to generate at least an additional portion of the first encoded version of the media title.

10. The method of claim 1, wherein the one or more interpolation operations comprise at least one Piecewise Cubic Hermite Interpolating operation, Polynomial interpolation operation, linear interpolation operation, quadratic interpolation operation, cubic interpolation operation, Akima spline operation, or cubic spline operation.

11. One or more non-transitory computer readable media including instructions that, when executed by one or more processors, cause the one or more processors to encode a media title by performing the steps of:
    encoding a first subsequence included in the media title across a first plurality of encoding points to generate a first plurality of encoded subsequences;
    performing one or more interpolation operations based on the first plurality of encoded subsequences to compute a plurality of estimated media metric values associated with a second plurality of encoding points;
    generating a first encoding recipe that specifies a different encoding point for each subsequence included in the media title based on the first plurality of encoded subsequences and the plurality of estimated media metric values;
    determining that the first encoding recipe specifies a first encoding point for the first subsequence, wherein the first encoding point is not included in the first plurality of encoding points; and
    encoding the first subsequence at the first encoding point to generate at least a portion of a first encoded version of the media title.

12. The one or more non-transitory computer readable media of claim 11, wherein each estimated media metric value included in the plurality of estimated media metric values comprises a different value for a bitrate, a size, a peak signal-to-noise-ratio, a linear video multimethod assessment fusion metric, or a harmonic video multimethod assessment fusion.

13. The one or more non-transitory computer readable media of claim 11, wherein each encoding point included in the first plurality of encoding points is associated with a different value of an encoding parameter.

14. The one or more non-transitory computer readable media of claim 11, wherein the plurality of estimated media metric values comprises a plurality of estimated values for a visual quality metric, and performing the one or more interpolation operations comprises:
    decoding the first plurality of encoded subsequences to generate a plurality of reconstructed subsequences;
    computing a plurality of values for the visual quality metric based on the plurality of reconstructed subsequences; and
    interpolating between at least two values included in the plurality of values for the visual quality metric to compute the plurality of estimated values for the visual quality metric.

15. The one or more non-transitory computer readable media of claim 11, wherein the plurality of estimated media metric values comprises a plurality of estimated bitrates, and performing the one or more interpolation operations comprises:
    determining a plurality of bitrates based of the first plurality of encoded subseqeuences; and
    interpolating between at least two bitrates included in the plurality of bitrates to compute the plurality of estimated bitrates.

16. The one or more non-transitory computer readable media of claim 11, wherein generating the first encoding recipe comprises:
    performing one or more optimization operations based on the first plurality of encoded subsequences and the plurality of estimated media metric values to generate a plurality of encoding recipes; and
    determining the first encoding recipe from the plurality of encoding recipes based on a first target bitrate or a first target value for a visual quality metric.

17. The one or more non-transitory computer readable media of claim 11, wherein the first plurality of encoding points is associated with a first resolution, and generating the first encoding recipe comprises:
    generating a first convex hull of rate-quality points based on the first plurality of encoded subsequences, the plurality of estimated media metric values, and a second plurality of encoded subsequences that is associated with both the first subsequence and a second resolution;
    generating a global convex hull of encoding recipes based on the first convex hull and a second convex hull that is associated with a second subsequence included in the media title; and
    determining the first encoding recipe from the global convex hull based on a target bitrate or a target level of visual quality.

18. The one or more non-transitory computer readable media of claim 11, wherein the at least a portion of the first encoded version of the media title comprises a first encoded subsequence, and the first encoded version of the media title is further generated by:
    determining that the first encoding recipe specifies a second encoding point for a second subsequence included in the media title;
    encoding the second subsequence at the second encoding point to generate a second encoded subsequence; and
    aggregating the first encoded subsequence and the second encoded subsequence to generate at least an additional portion of the first encoded version of the media title.

19. The one or more non-transitory computer readable media of claim 11, wherein the one or more interpolation operations comprise at least one Piecewise Cubic Hermite Interpolating operation, Polynomial interpolation operation, linear interpolation operation, quadratic interpolation operation, cubic interpolation operation, Akima spline operation, or cubic spline operation.

20. A system comprising:
    one or more memories storing instructions; and
    one or more processors that are coupled to the one or more memories and, when executing the instructions, are configured to:
        partition a media title into a plurality of subsequences;
        encode a first subsequence included in the plurality of subsequences across a plurality of encoding points to generate a plurality of encoded subsequences
        perform one or more interpolation operations based on the plurality of encoded subsequences to estimate a first media metric value associated with a first encoding point that is not included in the plurality of encoding points;
        perform one or more optimization operations based on the plurality of encoded subsequences and the first media metric value to generate a first encoding recipe that specifies a different encoding point for each subsequence included in the plurality of subsequences;
        determine that the first encoding recipe specifies the first encoding point for the first subsequence; and
        encode the first subsequence at the first encoding point to generate at least a portion of a first encoded version of the media title.

* * * * *